US011879465B2

(12) United States Patent
Ueda et al.

(10) Patent No.: US 11,879,465 B2
(45) Date of Patent: Jan. 23, 2024

(54) COMPRESSOR

(71) Applicant: FUJITSU GENERAL LIMITED, Kanagawa (JP)

(72) Inventors: Kenshi Ueda, Kanagawa (JP); Akira Inoue, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 541 days.

(21) Appl. No.: 17/259,024

(22) PCT Filed: Jul. 9, 2019

(86) PCT No.: PCT/JP2019/027222
§ 371 (c)(1),
(2) Date: Jan. 8, 2021

(87) PCT Pub. No.: WO2020/013205
PCT Pub. Date: Jan. 16, 2020

(65) Prior Publication Data
US 2021/0270271 A1  Sep. 2, 2021

(30) Foreign Application Priority Data
Jul. 11, 2018  (JP) .................................. 2018-131744

(51) Int. Cl.
*F04C 29/02*  (2006.01)
*F04B 39/04*  (2006.01)
(Continued)

(52) U.S. Cl.
CPC .............. *F04C 29/02* (2013.01); *F04B 39/04* (2013.01); *F04C 25/02* (2013.01); *H02K 1/20* (2013.01);
(Continued)

(58) Field of Classification Search
CPC ........... F04B 39/00–39/16; F04B 39/04; F04B 39/023; F04C 23/00–29/12; F04C 29/02;
(Continued)

(56) References Cited

U.S. PATENT DOCUMENTS 2,963,113 A * 12/1960 Ayling .................. F25B 31/002
417/372
3,003,684 A * 10/1961 Tarleton ................ F25B 31/026
417/372
(Continued)

FOREIGN PATENT DOCUMENTS

CN   1793655 A    6/2006
CN   101813090 A   8/2010
(Continued)

OTHER PUBLICATIONS

Jan. 26, 2022, Chinese Decision to Grant Patent issued for related CN Application No. 201980046190.1.

*Primary Examiner* — Devon C Kramer
*Assistant Examiner* — Benjamin Doyle
(74) *Attorney, Agent, or Firm* — Paratus Law Group, PLLC

(57) ABSTRACT

A compressor includes a motor unit that includes a rotor and a stator, a compressor unit that compresses a refrigerant by rotation of the rotor, and a container that forms an internal space in which the motor unit and the compressor unit are housed, wherein in the rotor, a rotor gas passage through which the refrigerant flows from an under-motor space of the internal space arranged on a side of the motor unit that is close to the compressor unit to an above-motor space of the internal space arranged on a side of the motor unit that is distant from the compressor unit is formed, in the stator, a stator gas passage through which the refrigerant flows from the under-motor space to the above-motor space is formed, (Continued)

and a cross-sectional area of the stator gas passage is 6.0 times or less a cross-sectional area of the rotor gas passage.

12 Claims, 12 Drawing Sheets

(51) Int. Cl.
    *F04C 25/02*     (2006.01)
    *F04B 39/02*     (2006.01)
    *H02K 1/20*     (2006.01)
    *H02K 1/32*     (2006.01)
    *H02K 21/16*     (2006.01)

(52) U.S. Cl.
    CPC ............... *H02K 1/32* (2013.01); *H02K 21/16* (2013.01); *F04B 39/023* (2013.01)

(58) Field of Classification Search
    CPC ......... F04C 25/02; F04C 23/008; H02K 1/20; H02K 1/32; H02K 21/16
    See application file for complete search history.

(56) References Cited

U.S. PATENT DOCUMENTS

| | | | | |
|---|---|---|---|---|
| 3,385,515 A * | 5/1968 | Parker | ..................... | F25B 31/02 417/419 |
| 3,514,225 A * | 5/1970 | Tuneo | .................... | F25B 31/026 417/367 |
| 4,640,669 A * | 2/1987 | Gannaway | ............ | F04C 23/008 184/6.16 |
| 4,762,471 A * | 8/1988 | Asanuma | .............. | F04C 29/026 417/372 |
| 4,846,635 A * | 7/1989 | Fry | ....................... | F04B 39/127 417/902 |
| 5,037,278 A * | 8/1991 | Fujio | .................... | F04C 18/0215 418/55.6 |
| 5,421,708 A * | 6/1995 | Utter | ....................... | F04C 28/28 418/94 |
| 5,449,279 A * | 9/1995 | Hill | ....................... | F04C 27/005 418/55.6 |
| 5,545,021 A * | 8/1996 | Fukuoka | ................ | F04C 29/02 418/99 |
| 5,609,478 A * | 3/1997 | Utter | .................... | F04C 29/0057 418/55.6 |
| 6,234,768 B1 | 5/2001 | Harakawa et al. | | |
| 6,499,971 B2 * | 12/2002 | Narney, II | ............ | F04C 23/008 418/94 |
| 6,537,043 B1 * | 3/2003 | Chen | ..................... | F04C 29/126 137/543.17 |
| 6,623,253 B1 * | 9/2003 | Onoda | .................... | F04B 35/04 310/59 |
| 6,658,885 B1 * | 12/2003 | Zhou | ....................... | F04C 29/02 62/472 |
| 9,429,156 B2 * | 8/2016 | Seol | ...................... | F04C 15/0065 |
| 2003/0068236 A1 * | 4/2003 | Tadano | ................. | F01C 21/108 417/410.3 |
| 2004/0141859 A1 * | 7/2004 | Narney, II | ............ | F04C 29/042 417/410.3 |
| 2004/0219037 A1 * | 11/2004 | Higuchi | ................ | F04C 18/332 417/572 |
| 2005/0002803 A1 * | 1/2005 | Kim | ...................... | F04C 23/008 417/410.3 |
| 2006/0192171 A1 * | 8/2006 | Okaichi | ................ | F04C 23/008 252/68 |
| 2008/0113538 A1 * | 5/2008 | Masuda | ................ | F04C 29/128 439/179 |
| 2008/0145252 A1 * | 6/2008 | Ku | ....................... | F04C 18/3442 418/54 |
| 2009/0100861 A1 * | 4/2009 | Higuchi | ................ | F04C 29/028 62/468 |
| 2010/0074774 A1 * | 3/2010 | Kojima | ............... | F04C 29/0085 417/410.3 |
| 2010/0150750 A1 * | 6/2010 | Oh | ......................... | H02K 1/276 310/216.106 |
| 2010/0215525 A1 * | 8/2010 | Ogasawara | ........... | F04C 23/001 62/470 |
| 2010/0296950 A1 * | 11/2010 | Kataoka | .............. | F04B 39/0238 417/410.1 |
| 2010/0314955 A1 * | 12/2010 | Masuda | ................ | F04C 29/026 310/56 |
| 2012/0107151 A1 * | 5/2012 | Yokoyama | .............. | F04B 39/16 417/366 |
| 2012/0269667 A1 | 10/2012 | Sakima et al. | | |
| 2015/0052936 A1 * | 2/2015 | Yokoyama | .......... | F04C 29/0021 62/470 |
| 2016/0333880 A1 | 11/2016 | Onara et al. | | |
| 2017/0268806 A1 | 9/2017 | Knopp et al. | | |
| 2017/0306964 A1 * | 10/2017 | Kim | ..................... | F04C 29/0085 |
| 2018/0097419 A1 * | 4/2018 | Suzuki | ................... | H02K 3/522 |
| 2021/0013756 A1 * | 1/2021 | Yahaba | .................... | H02K 5/12 |
| 2021/0057949 A1 * | 2/2021 | Hasegawa | ................ | H02K 1/30 |

FOREIGN PATENT DOCUMENTS

| | | | |
|---|---|---|---|
| CN | 102459909 A | 5/2012 | |
| CN | 102510951 A | 6/2012 | |
| JP | 2006-177225 A | 7/2006 | |
| JP | 2006177225 | * 7/2006 | ............. F04B 39/00 |
| JP | 2008-228395 A | 9/2008 | |
| WO | WO 2012/026081 A1 | 3/2012 | |

* cited by examiner

COMPRESSOR

CROSS REFERENCE TO PRIOR APPLICATION

This application is a National Stage Patent Application of PCT International Patent Application No. PCT/JP2019/027222 (filed on Jul. 9, 2019) under 35 U.S.C. § 371, which claims priority to Japanese Patent Application No. 2018-131744 (filed on Jul. 11, 2018), which are all hereby incorporated by reference in their entirety.

A technology of the present disclosure relates to a compressor.

BACKGROUND

A hermetic compressor in which a compressor unit and a motor unit are housed inside a hermetic container has been known. The motor unit includes a stator and a rotor. The stator generates a rotating magnetic field to rotate the rotor. The compressor unit is arranged below the motor unit, and the rotor rotates to compress a refrigerant. The refrigerant compressed by the compressor unit moves to a space above the motor unit inside the hermetic container through a gas passage formed in the motor unit, and is discharged to a device at the subsequent stage. Freezer oil that lubricates the compressor unit is stored inside the hermetic container, passes through the gas passage formed in the motor unit together with the refrigerant compressed by the compressor unit, and is discharged to the device at the subsequent stage together with the refrigerant. A compressor in which a refrigerant is separated from oil in a gas flow path formed in a motor unit to decrease the amount of freezer oil discharged together with the refrigerant has been known (see Patent Literature 1).

CITATION LIST

Patent Literature

Patent Literature 1: Japanese Laid-open Patent Publication No. 2008-228395

SUMMARY

Technical Problem

An object of the disclosed technology is to provide a compressor that further decreases the amount of freezer oil discharged together with a refrigerant.

Solution to Problem

Advantageous Effects of Invention

The disclosed compressor can decrease the amount of freezer oil discharged together with a refrigerant.

DESCRIPTION OF EMBODIMENTS

Hereinafter, a compressor according to an embodiment disclosed in the present application will be described with reference to the drawings. Note that the following description does not limit the technology of the present disclosure. Further, in the following description, the same components are denoted by the same reference signs, and an overlapping description is omitted.

First Embodiment

Figure 1:
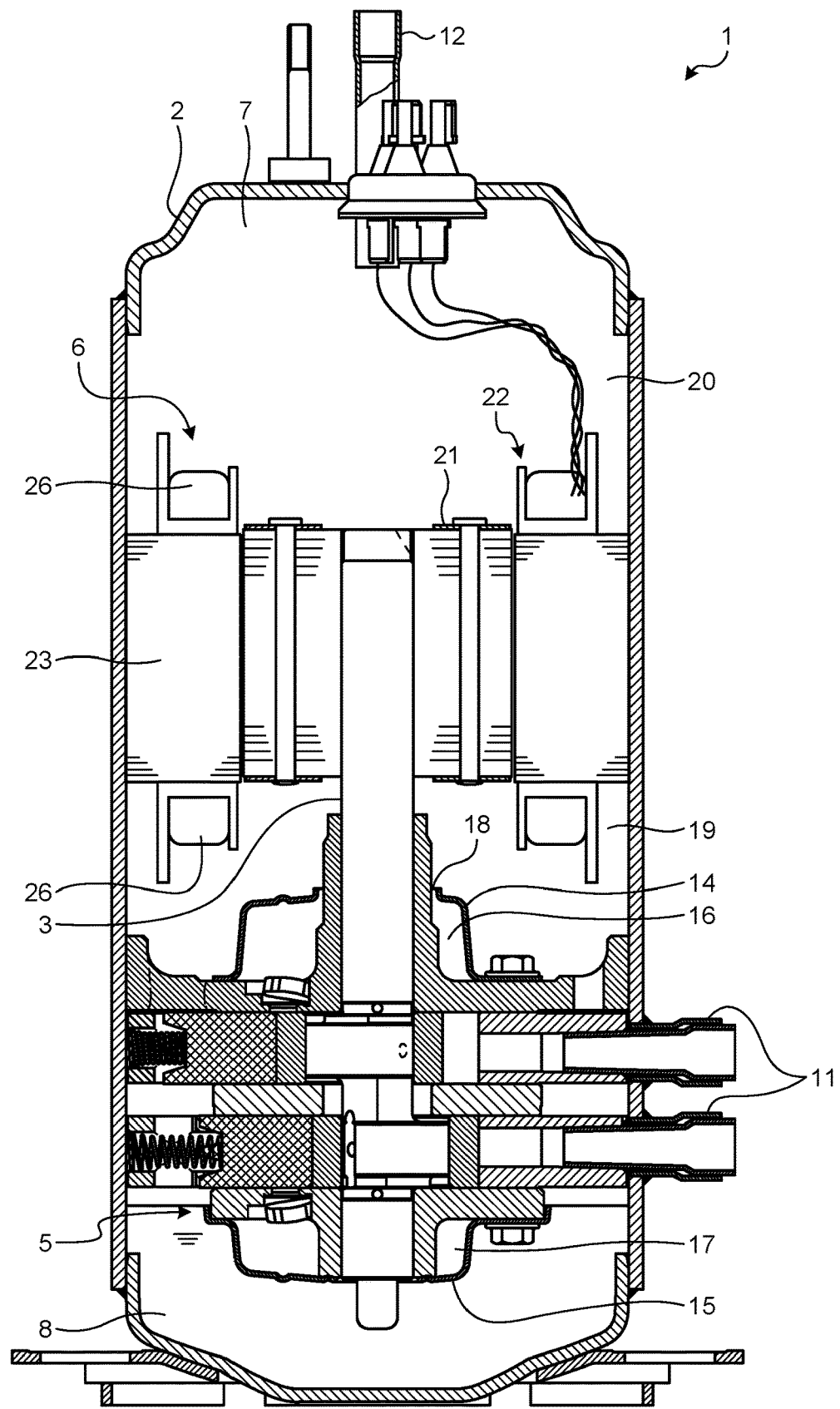
FIG. 1 is a vertical cross-sectional view illustrating a compressor of a first embodiment.

FIG. 1 is a vertical cross-sectional view illustrating a compressor 1 of a first embodiment. As illustrated in FIG. 1, the compressor 1 includes a container 2, a shaft 3, a compressor unit 5, and a motor unit 6. The container 2 forms a hermetic internal space 7. The internal space 7 is formed in a substantially columnar shape. The container 2 is formed so that a central axis of a column of the internal space 7 is parallel to a vertical direction when vertically placed on a horizontal plane. In the container 2, an oil reservoir 8 is formed in a lower portion of the internal space 7. Freezer oil that lubricates the compressor unit 5 is stored in the oil reservoir 8. A suction pipe 11 for sucking a refrigerant and a discharge pipe 12 for discharging the compressed refrigerant are connected to the container 2. The shaft 3 is formed in a rod shape and is arranged in the internal space 7 of the container 2 so that one end is arranged in the oil reservoir 8. The shaft 3 is supported by the container 2 to as to be rotatable around a rotation axis parallel to the central axis of the column formed by the internal space 7. The shaft 3 rotates to supply the freezer oil stored in the oil reservoir 8 to the compressor unit 5.

The compressor unit 5 is arranged in the lower portion of the internal space 7 and is arranged above the oil reservoir 8. The compressor 1 further includes an upper muffler cover 14 and a lower muffler cover 15. The upper muffler cover 14 is arranged in an upper portion of the compressor unit 5 in the internal space 7. In the upper muffler cover 14, an upper muffler chamber 16 is formed. The lower muffler cover 15 is arranged in a lower portion of the compressor unit 5 in the internal space 7 and is arranged above the oil reservoir 8. In the lower muffler cover 15, a lower muffler chamber 17 is formed. The lower muffler chamber 17 communicates with the upper muffler chamber 16 via a communication passage (not illustrated) formed in the compressor unit 5. A compressed refrigerant discharge hole 18 is formed between the upper muffler cover 14 and the shaft 3, and the upper muffler chamber 16 communicates with the internal space 7 via the compressed refrigerant discharge hole 18. The compressor unit 5 is a so-called rotary type compressor, in which the refrigerant supplied from the suction pipe 11 is compressed by the rotation of the shaft 3, and the compressed refrigerant is supplied to the upper muffler chamber 16 and the lower muffler chamber 17. The refrigerant is compatible with the freezer oil.

The motor unit 6 is arranged above the compressor unit 5 in the internal space 7. The internal space 7 is separated by the motor unit 6 into an under-motor space 19 and an above-motor space 20. The under-motor space 19 is formed on a side of the internal space 7 that is closer to the compressor unit 5 than the motor unit 6, that is, is formed between the compressor unit 5 and the motor unit 6. The above-motor space 20 is formed on a side of the internal space 7 that is more distant from the compressor unit 5 than from the motor unit 6. The motor unit 6 includes a rotor 21 and a stator 22. The rotor 21 is fixed to the shaft 3. The stator 22 is formed in a substantially cylindrical shape, is arranged so as to surround the rotor 21, and is fixed to the container 2. The stator 22 includes a stator core 23 and a winding 26.

[Stator Core]

Figure 2:
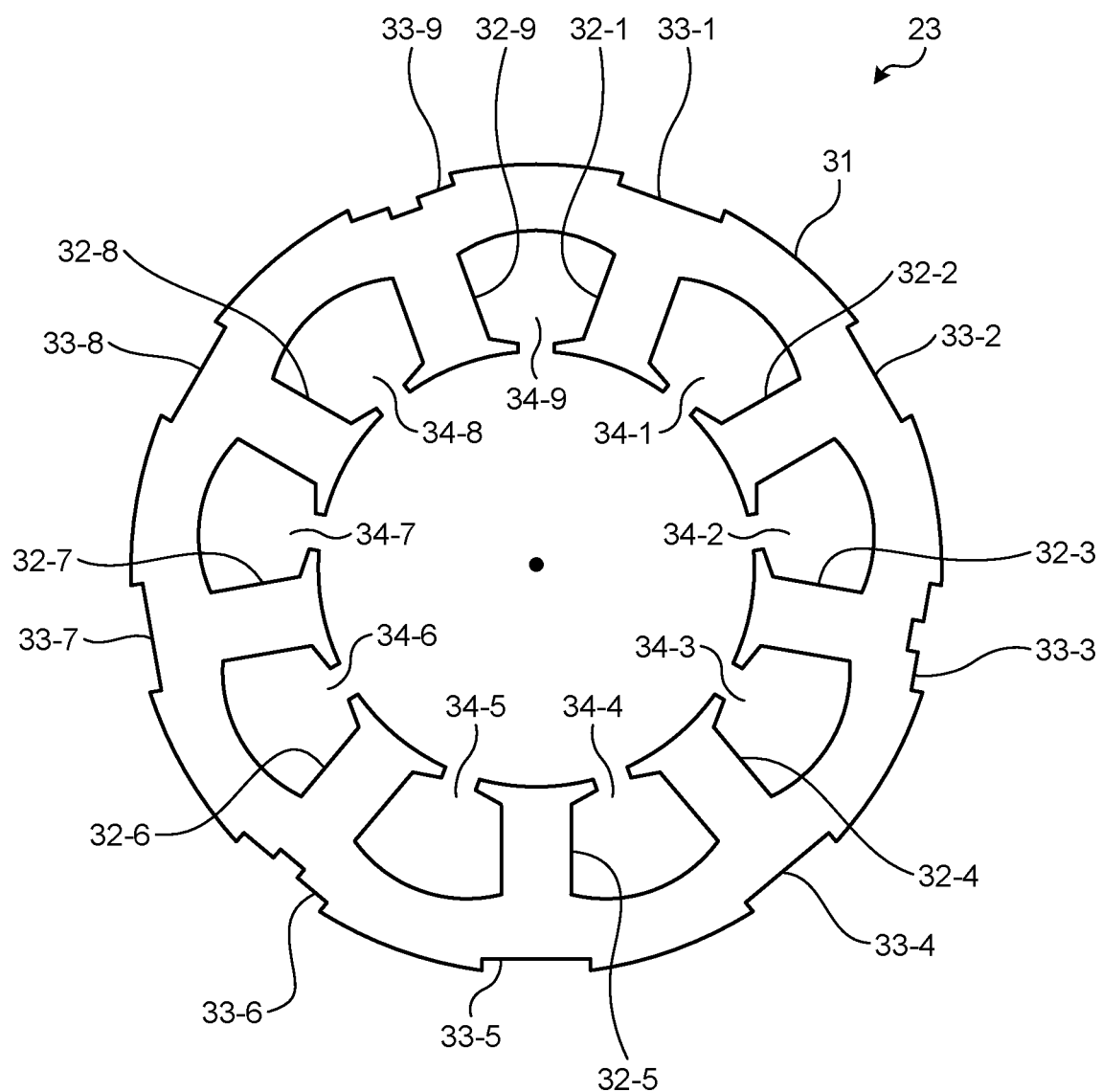
FIG. 2 is a plan view illustrating a stator core.

FIG. 2 is a plan view illustrating the stator core 23. The stator core 23 is formed by stacking a plurality of steel plates formed of a soft magnetic material such as a silicon steel plate, and includes a yoke portion 31 and a plurality of teeth portions 32-1 to 32-9 as illustrated in FIG. 2. The yoke portion 31 is formed in a substantially cylindrical shape. The teeth portion 32-1 among the plurality of teeth portions 32-1 to 32-9 is formed so as to protrude from an inner circumferential surface of the yoke portion 31 toward a central axis of a cylinder of the yoke portion 31. Other teeth portions of the stator core that are different from the teeth portion 32-1 among the plurality of teeth portions 32-1 to 32-9 are also formed so as to protrude toward the axis of the cylinder of the yoke portion 31, similarly to the teeth portion 32-1. The plurality of teeth portions 32-1 to 32-9 are formed so as to be arranged at equal intervals of 40 degrees on the inner circumferential surface of the yoke portion 31. In the stator core 23, a plurality of slots 34-1 to 34-9 are further formed. The plurality of slots 34-1 to 34-9 are formed between the plurality of teeth portions 32-1 to 32-9, respectively.

In the stator core 23, a plurality of notches 33-1 to 33-9 are formed. The plurality of notches 33-1 to 33-9 are formed in an outer circumferential surface of the yoke portion 31 that faces an inner wall of the container 2, and correspond to the plurality of teeth portions 32-1 to 32-9, respectively. The notch 33-1 corresponding to the teeth portion 32-1 among the plurality of notches 33-1 to 33-9 is formed so that the teeth portion 32-1 is arranged between the central axis of the cylinder of the yoke portion 31 and the notch 33-1. Other notches different from the notch 33-1 among the plurality of notches 33-1 to 33-9 are also formed in the outer circumferential surface of the yoke portion 31, similarly to the notch 33-1.

[Motor Unit]

Figure 3:
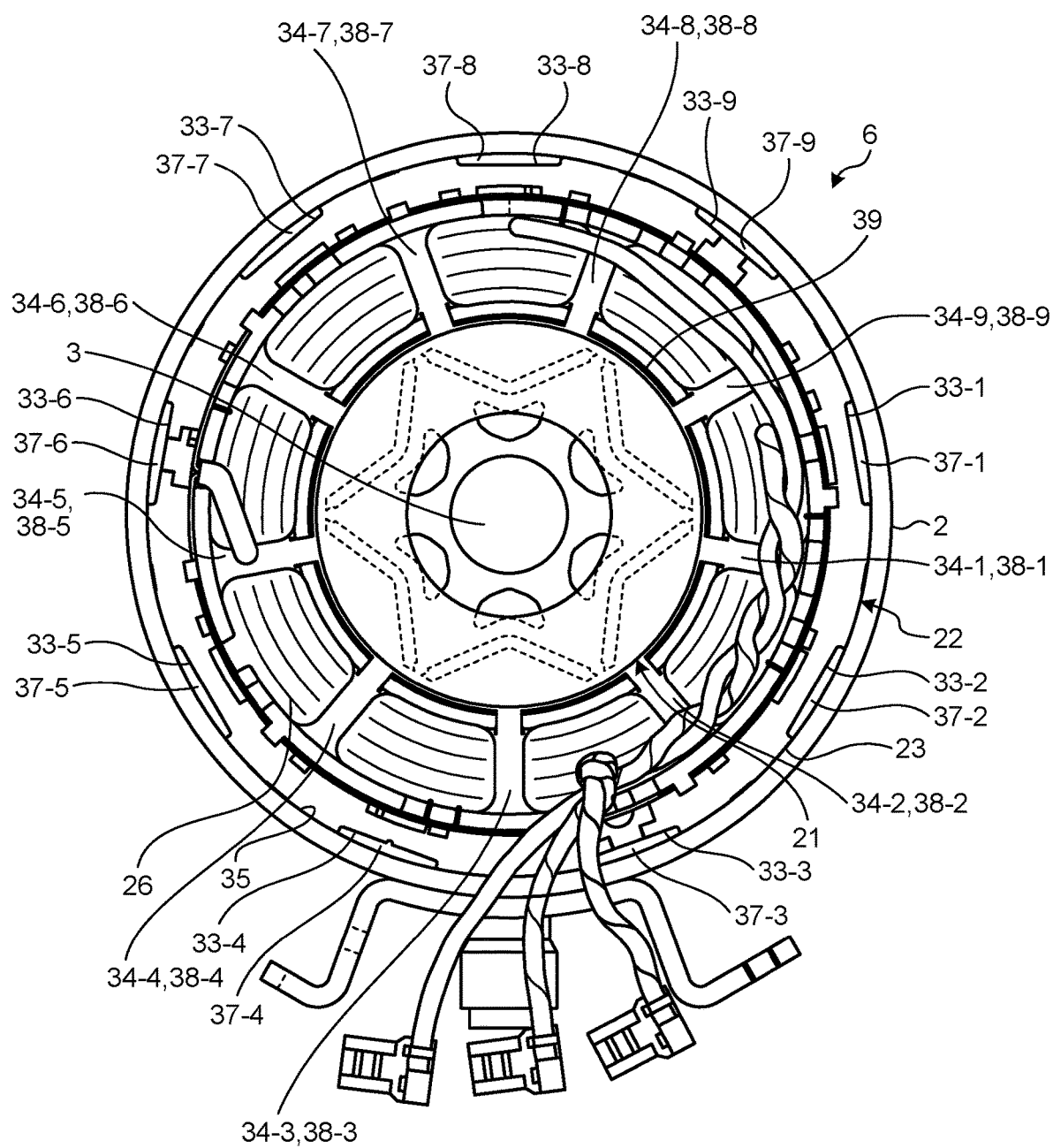
FIG. 3 is a plan view illustrating a motor unit.

FIG. 3 is a plan view illustrating the motor unit 6. As illustrated in FIG. 3, the winding 26 is wound around each of the plurality of teeth portions 32-1 to 32-9 of the stator core 23, and a part thereof is arranged in the plurality of slots 34-1 to 34-9. The stator 22 is arranged so that a region of the outer circumferential surface of the yoke portion 31 of the stator core 23, in which the plurality of notches 33-1 to 33-9 are not formed, is in close contact with the inner wall of the container 2, and the stator 22 is fixed to the container 2.

A stator gas passage is formed in the motor unit 6. The stator gas passage includes a plurality of outer circumferential notch gaps 37-1 to 37-9, a plurality of slot gaps 38-1 to 38-9, and an air gap 39. The plurality of outer circumferential notch gaps 37-1 to 37-9 correspond to the plurality of notches 33-1 to 33-9, respectively. The plurality of outer circumferential notch gaps 37-1 to 37-9 form a stator outer circumferential gas passage. The outer circumferential notch gap 37-1 is formed in a space surrounded by the notch 33-1 and an inner circumferential surface 35 of the container 2. The outer circumferential notch gap 37-1 allows the under-motor space 19 and the above-motor space 20 to communicate with each other. Other outer circumferential notch gaps different from the outer circumferential notch gap 37-1 among the plurality of outer circumferential notch gaps 37-1 to 37-9 are also formed similarly to the outer circumferential notch gap 37-1, and allow the under-motor space 19 and the above-motor space 20 to communicate with each other.

The plurality of slot gaps 38-1 to 38-9 correspond to the plurality of slots 34-1 to 34-9, respectively. The slot gap 38-1 among the plurality of slot gaps 38-1 to 38-9 is formed in the slot 34-1 that corresponds to the slot gap 38-1 among the plurality of slots 34-1 to 34-9. That is, the slot gap 38-1 is formed in a region of the slot 34-1, in which the winding 26 is not arranged, and allows the under-motor space 19 and the above-motor space 20 to communicate with each other. Other slot gaps different from the slot gap 38-1 among the plurality of slot gaps 38-1 to 38-9 are also formed in the plurality of slots 34-1 to 34-9 similarly to the slot gap 38-1, and allow the under-motor space 19 and the above-motor space 20 to communicate with each other.

The air gap 39 is formed between the rotor 21 and the stator 22, that is, between an outer circumferential surface of the rotor 21 and surfaces of the plurality of teeth portions 32-1 to 32-9 that face the rotor 21. The air gap 39 prevents the rotor 21 and the stator 22 from interfering with each other, and allows the under-motor space 19 and the above-motor space 20 to communicate with each other.

[Rotor 21]

Figure 4:
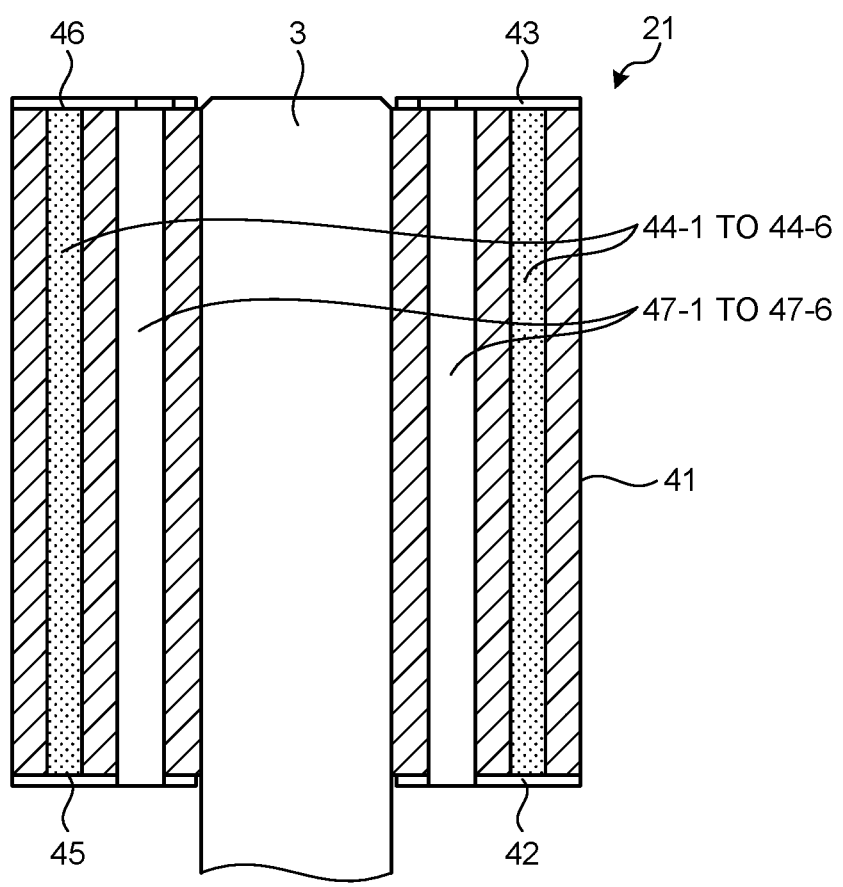
FIG. 4 is a cross-sectional view illustrating a rotor.

FIG. 4 is a cross-sectional view illustrating the rotor 21. As illustrated in FIG. 4, the rotor 21 includes a rotor core 41, a lower rotor end plate 42, an upper rotor end plate 43, and a plurality of permanent magnets 44-1 to 44-6. The rotor core 41 is formed in a substantially columnar shape, and is formed by stacking a plurality of steel plates formed of a soft magnetic material such as a silicon steel plate. The rotor core 41 is arranged so that a central axis of a column formed by the rotor core 41 overlaps the rotation axis around which the shaft 3 rotates, and the rotor core 41 is fixed to the shaft 3. In the rotor core 41, a lower rotor end surface 45 and an upper rotor end surface 46 are formed. The lower rotor end surface 45 is formed at a portion corresponding to a bottom surface of the column formed by the rotor core 41, and is formed at a portion of the rotor core 41 that faces the compressor unit 5. The upper rotor end surface 46 is formed at a portion corresponding to a bottom surface of the column of the rotor core 41, and is formed on a side of the rotor core 41 that is opposite to a side on which the lower rotor end surface 45 is formed.

In the rotor core 41, a plurality of rotor gas holes 47-1 to 47-6 are further formed. The plurality of rotor gas holes 47-1 to 47-6 are each formed parallel to the central axis of the rotor core 41, and are formed so as to penetrate through the lower rotor end surface 45 and the upper rotor end surface 46.

The lower rotor end plate 42 is formed in a substantially disk shape. The lower rotor end plate 42 is in close contact with the lower rotor end surface 45 so as to cover the lower rotor end surface 45 of the rotor core 41, and is fixed to the rotor core 41. The upper rotor end plate 43 is formed in a substantially disk shape. The upper rotor end plate 43 is in close contact with the upper rotor end surface 46 so as to cover the upper rotor end surface 46 of the rotor core 41, and is fixed to the rotor core 41.

The plurality of permanent magnets 44-1 to 44-6 are embedded inside the rotor core 41. The lower rotor end plate 42 and the upper rotor end plate 43 are properly attached to the rotor core 41, such that the plurality of permanent magnets 44-1 to 44-6 are fixed to the rotor core 41 so as not to fall off from the rotor core 41.

Figure 5:
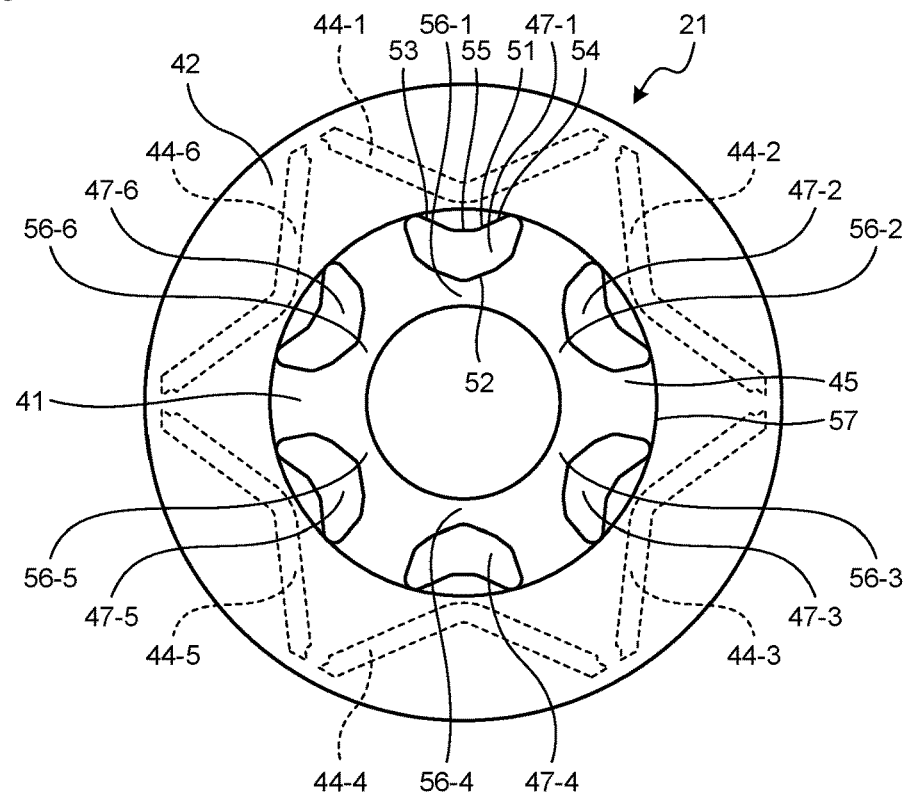
FIG. 5 is a bottom view illustrating the rotor of the compressor of first embodiment.

FIG. 5 is a bottom view illustrating the rotor 21 of the compressor 1 of the first embodiment. The plurality of rotor gas holes 47-1 to 47-6 are arranged at equal intervals around the central axis of the rotor core 41 as illustrated in FIG. 5. The plurality of permanent magnets 44-1 to 44-6 correspond to a plurality of rotor gas holes 47-1 to 47-6, respectively. The permanent magnet 44-1 among the plurality of permanent magnets 44-1 to 44-6 is formed in a V shape so that the center protrudes toward an inner diameter side, and is arranged adjacent to an outer diameter side of the rotor gas hole 47-1 corresponding to the permanent magnet 44-1 among the plurality of rotor gas holes 47-1 to 47-6. Other permanent magnets different from the permanent magnet 44-1 among the plurality of permanent magnets 44-1 to 44-6 are also formed in a V shape, similarly to the permanent magnet 44-1, and are arranged adjacent to outer diameter sides of the plurality of rotor gas holes 47-1 to 47-6, respectively.

The rotor gas hole 47-1 is formed in a V shape so that the center protrudes toward the inner diameter side, and in the rotor gas hole 47-1, an exterior inner wall surface 51 and an interior inner wall surface 52 are formed. The exterior inner wall surface 51 forms a portion of the inner wall surface of the rotor gas hole 47-1 that is arranged adjacent to the outer diameter side. The exterior inner wall surface 51 is formed along a curved surface that is curved so as to be convex toward the inner diameter side, and is formed along the surface of the permanent magnet 44-1 that is adjacent to the inner diameter side. That is, the exterior inner wall surface 51 includes a first exterior inner wall surface portion 53, a second exterior inner wall surface portion 54, and a middle exterior inner wall surface portion 55. The middle exterior inner wall surface portion 55 is formed between the first exterior inner wall surface portion 53 and the second exterior inner wall surface portion 54, and the first exterior inner wall surface portion 53 and the second exterior inner wall surface portion 54 are connected via the middle exterior inner wall surface portion 55. The middle exterior inner wall surface portion 55 is arranged to be more adjacent to the inner diameter side than the first exterior inner wall surface portion 53 and the second exterior inner wall surface portion 54 are. The interior inner wall surface 52 is formed along a curved surface that is curved so as to be convex toward the inner diameter side, and the center protrudes toward the inner diameter side. Other rotor gas holes different from the rotor gas holes 47-1 among the plurality of rotor gas holes 47-1 to 47-6 are also formed in a V shape, similarly to the rotor gas holes 47-1.

Here, the plurality of outer circumferential notch gaps 37-1 to 37-9 are formed so that the cross-sectional area of the stator outer circumferential gas passage is included in a predetermined range. The cross-sectional area of the stator outer circumferential gas passage indicates the area of a cross-sectional surface where a plane perpendicular to the rotation axis of the shaft 3 intersects the plurality of outer circumferential notch gaps 37-1 to 37-9. That is, the plurality of outer circumferential notch gaps 37-1 to 37-9 are formed so that the cross-sectional area of the stator outer circumferential gas passage is included in a range of 1.2 to 1.7 times the cross-sectional area of a rotor gas passage. The cross-sectional area of the rotor gas passage indicates the area of a cross-sectional surface where a plane perpendicular to the rotation axis of the shaft 3 intersects the plurality of rotor gas holes 47-1 to 47-6. The plurality of outer circumferential notch gaps 37-1 to 37-9 are also formed so that the cross-sectional area of the stator gas passage is included in a range of 6.0 times or less the cross-sectional area of the rotor gas passage. The cross-sectional area of the stator gas passage indicates the sum of the cross-sectional area of the stator outer circumferential gas passage, the cross-sectional area of the slot gap, and the cross-sectional area of the air gap. The cross-sectional area of the stator outer circumferential gas passage indicates the area of a cross-sectional surface where a plane perpendicular to the rotation axis of the shaft 3 intersects the plurality of outer circumferential notch gaps 37-1 to 37-9. The cross-sectional area of the slot gap indicates the area of a cross-sectional surface where a plane perpendicular to the rotation axis of the shaft 3 intersects the plurality of slot gaps 38-1 to 38-9. The cross-sectional area of the air gap indicates the area of a cross-sectional surface where a plane perpendicular to the rotation axis of the shaft 3 intersects the air gap 39.

The lower rotor end surface 45 includes a plurality of lower inner diameter side adjacent regions 56-1 to 56-6. The plurality of lower inner diameter side adjacent regions 56-1 to 56-6 are arranged to be more adjacent to the inner diameter side than the plurality of rotor gas holes 47-1 to 47-6 are, respectively, and are adjacent to lower ends of the plurality of rotor gas holes 47-1 to 47-6, respectively. In the lower rotor end plate 42, a lower opening 57 is formed. The lower opening 57 is formed at the center of the lower rotor end plate 42. The lower opening 57 allows each of the lower ends of the plurality of rotor gas holes 47-1 to 47-6 that are adjacent to the lower rotor end surfaces 45 to be open to the under-motor space 19 in the internal space 7, thereby allowing each of the plurality of rotor gas holes 47-1 to 47-6 to communicate with the under-motor space 19. The lower opening 57 also exposes each of the plurality of lower inner diameter side adjacent regions 56-1 to 56-6 to the under-motor space 19.

Figure 6:
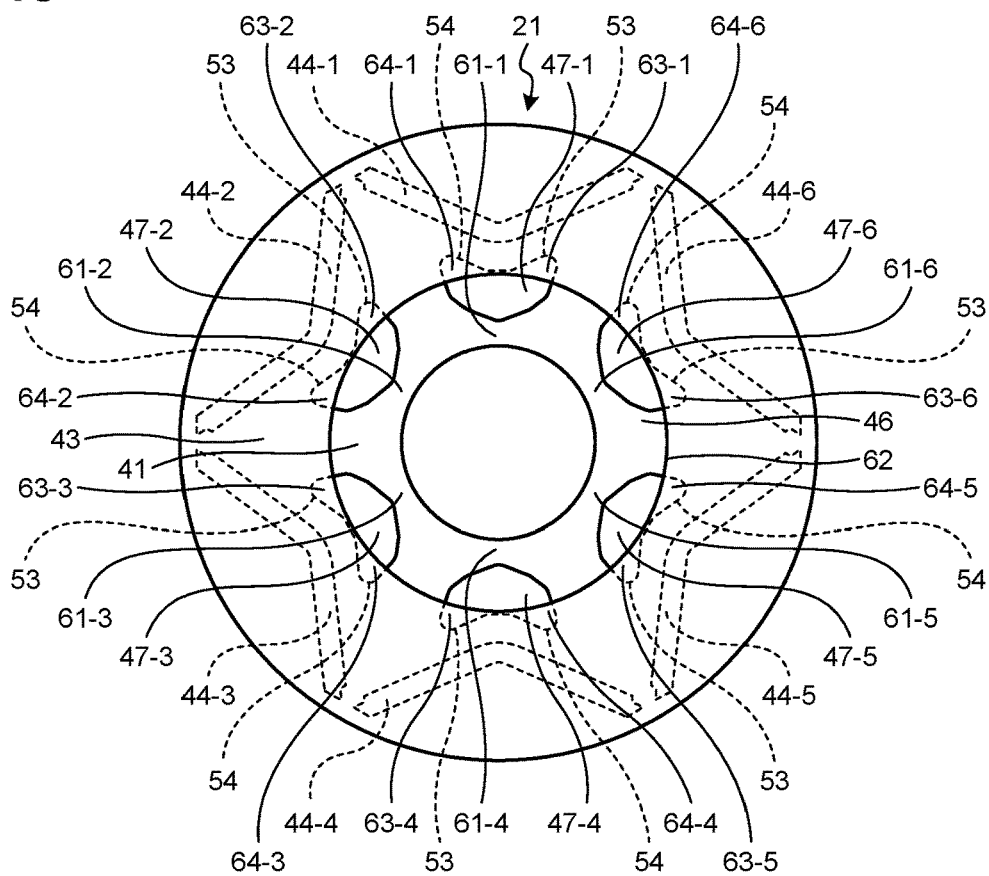
FIG. 6 is a top view illustrating the rotor of the compressor of the first embodiment.

FIG. 6 is a top view illustrating the rotor 21 of the compressor 1 of the first embodiment. The upper rotor end surface 46 includes a plurality of upper inner diameter side adjacent regions 61-1 to 61-6, as illustrated in FIG. 6. The plurality of upper inner diameter side adjacent regions 61-1 to 61-6 are arranged to be more adjacent to the inner diameter side that is close to the rotation axis of the shaft 3 than the plurality of rotor gas holes 47-1 to 47-6 are, respectively, and are adjacent to upper ends of the plurality of rotor gas holes 47-1 to 47-6, respectively. In the upper rotor end plate 43, an upper opening 62, a plurality of first protrusions 63-1 to 63-6, and a plurality of second protrusions 64-1 to 64-6 are formed.

The upper opening 62 is formed at the center of the upper rotor end plate 43. The upper opening 62 exposes an upper end of the shaft 3 to the above-motor space 20 in the internal space 7. The upper opening 62 also allows a part of the upper end of each of the plurality of rotor gas holes 47-1 to 47-6 that is adjacent to the inner diameter side to be open to the above-motor space 20, the upper end being adjacent to the upper rotor end surface 46, and allows each of the plurality of rotor gas holes 47-1 to 47-6 to communicate with the above-motor space 20. The upper opening 62 also exposes each of the plurality of upper inner diameter side adjacent regions 61-1 to 61-6 to the above-motor space 20.

The plurality of first protrusions 63-1 to 63-6 are each formed at the edge of the upper opening 62. The plurality of first protrusions 63-1 to 63-6 cover regions adjacent to the first exterior inner wall surface portions 53 of the upper ends of the plurality of rotor gas holes 47-1 to 47-6, respectively. The plurality of second protrusions 64-1 to 64-6 are each formed at the edge of the upper opening 62. The plurality of second protrusions 64-1 to 64-6 cover regions adjacent to the second exterior inner wall surface portions 54 of the upper ends of the plurality of rotor gas holes 47-1 to 47-6, respectively.

[Operation of Compressor 1]

The compressor 1 is provided in a freezing cycle device (not illustrated), and is used for compressing the refrigerant and circulating the refrigerant in the freezing cycle device. The motor unit 6 of the compressor 1 generates a rotating magnetic field by applying a three-phase voltage to the winding 26 of the stator 22. The rotor 21 is rotated by the rotating magnetic field generated by the stator 22. The plurality of permanent magnets 44-1 to 44-6 embedded in the rotor 21 generate heat when the rotor 21 is rotated by the rotating magnetic field generated by the stator 22. The motor unit 6 rotates the shaft 3 by the rotation of the rotor 21.

When the shaft 3 rotates, the compressor unit 5 sucks low-pressure refrigerant gas through the suction pipe 11 and compresses the sucked low-pressure refrigerant gas to generate high-pressure refrigerant gas, and supplies the high-pressure refrigerant gas to the upper muffler chamber 16 and the lower muffler chamber 17. The lower muffler cover 15 reduces the pressure pulsation of the high-pressure refrigerant gas supplied to the lower muffler chamber 17, and supplies the high-pressure refrigerant gas with the reduced pressure pulsation to the upper muffler chamber 16. The upper muffler cover 14 reduces the pressure pulsation of the high-pressure refrigerant gas supplied to the upper muffler chamber 16, and supplies the high-pressure refrigerant gas with the reduced pressure pulsation to the under-motor space 19 in the internal space 7 through the compressed refrigerant discharge hole 18. The temperature of the high-pressure refrigerant gas supplied to the under-motor space 19 is lower than the temperature of the plurality of permanent magnets 44-1 to 44-6 when the rotor 21 rotates.

The high-pressure refrigerant gas supplied to the under-motor space 19 is supplied to the above-motor space 20 in the internal space 7 by passing through the gas passage formed in the motor unit 6. The plurality of permanent magnets 44-1 to 44-6 are cooled by the high-pressure refrigerant gas passing through the plurality of rotor gas holes 47-1 to 47-6. The compressor 1 can cool the plurality of permanent magnets 44-1 to 44-6 by using the high-pressure refrigerant gas passing through the plurality of rotor gas holes 47-1 to 47-6 due to a short distance between the plurality of rotor gas holes 47-1 to 47-6 and the plurality of permanent magnets 44-1 to 44-6. The refrigerant supplied to the above-motor space 20 is discharged to a device at the subsequent stage of the compressor 1 in the freezing cycle device through the discharge pipe 12.

Figure 7:
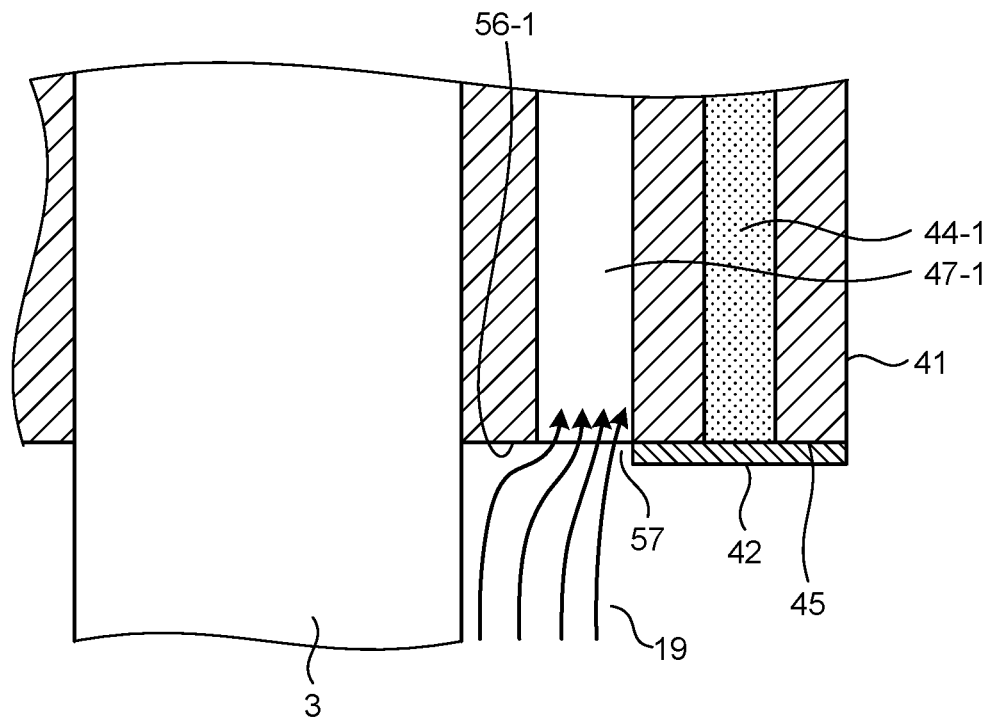
FIG. 7 is an enlarged cross-sectional view illustrating the vicinity of a lower end of a rotor gas hole.

FIG. 7 is an enlarged cross-sectional view illustrating the vicinity of the lower end of the rotor gas hole 47-1. Since the high-pressure refrigerant gas flowing out from the compressed refrigerant discharge hole 18 moves upward along the shaft 3, as illustrated in FIG. 7, the high-pressure refrigerant gas moves diagonally toward the outer diameter side from the shaft 3 side, and enters the rotor gas hole 47-1. Since the lower inner diameter side adjacent region 56-1 is exposed to the under-motor space 19, the lower rotor end plate 42 hardly interferes with the high-pressure refrigerant gas that diagonally enters the rotor gas hole 47-1 from the shaft 3 side. Therefore, the compressor 1 can reduce the resistance that the high-pressure refrigerant gas receives when entering the rotor gas hole 47-1 from the under-motor space 19, and reduce the pressure loss when the high-pressure refrigerant gas enters the rotor gas hole 47-1. Since the lower inner diameter side adjacent region 56-1 is exposed, the compressor 1 can further decrease the length of a flow path connecting the under-motor space 19 and the above-motor space 20 via the rotor gas hole 47-1 by the thickness of the lower rotor end plate 42. That is, the length of the flow path in the compressor 1 can be shorter than that in other compressors in which the plurality of lower inner diameter side adjacent regions 56-1 to 56-6 are covered with the lower rotor end plate 42. The compressor 1 can reduce the flow path resistance of the high-pressure refrigerant gas passing through the flow path due to the short length of the flow path, and can reduce the pressure loss when the high-pressure refrigerant gas passes through the flow path. The compressor 1 can suppress a decrease in the pressure of the refrigerant discharged to the device at the subsequent stage by reducing the pressure loss when the high-pressure refrigerant gas passes through the flow path to compress the refrigerant with high efficiency.

Figure 8:
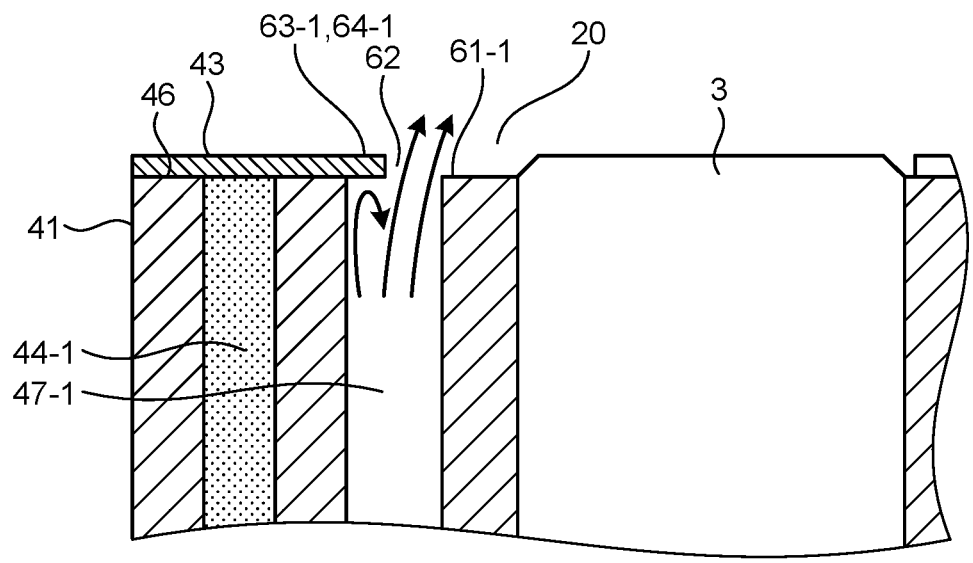
FIG. 8 is an enlarged cross-sectional view illustrating the vicinity of an upper end of the rotor gas hole.

FIG. 8 is an enlarged cross-sectional view illustrating the vicinity of the upper end of the rotor gas hole 47-1. When the high-pressure refrigerant gas passes through the rotor gas hole 47-1, the high-pressure refrigerant gas collides with the first protrusion 63-1 or the second protrusion 64-1 as illustrated in FIG. 8, and thus flows out diagonally from the upper end of the rotor gas hole 47-1 toward the rotation axis of the shaft 3. Since the upper inner diameter side adjacent region 61-1 is exposed to the above-motor space 20, the upper rotor end plate 43 hardly interferes with the high-pressure refrigerant gas that flows out diagonally from the upper end of the rotor gas hole 47-1 toward the rotation axis of the shaft 3. Therefore, the motor unit 6 can reduce the resistance that the high-pressure refrigerant gas receives when flowing out diagonally from the upper end of the rotor gas hole 47-1 toward the rotation axis of the shaft 3, and reduce the pressure loss when the high-pressure refrigerant gas flows out from the rotor gas hole 47-1. Since the upper inner diameter side adjacent region 61-1 is exposed to the above-motor space 20, the motor unit 6 can further decrease the length of the flow path connecting the under-motor space 19 and the above-motor space 20 via the rotor gas hole 47-1 by the thickness of the upper rotor end plate 43. The motor unit 6 can reduce the flow path resistance of the high-pressure refrigerant gas passing through the flow path due to the short length of the flow path, and can reduce the pressure loss when the high-pressure refrigerant gas passes through the flow path. Similar to the rotor gas hole 47-1, the pressure loss when the high-pressure refrigerant gas passes through other rotor gas holes that are different from the rotor gas hole 47-1 among the plurality of rotor gas holes 47-1 to 47-6 can also be reduced. The compressor 1 can suppress a decrease in the pressure of the refrigerant discharged to the device at the subsequent stage by reducing the pressure loss when the high-pressure refrigerant gas passes through the flow path to compress the refrigerant with high efficiency.

The freezer oil stored in the oil reservoir 8 is supplied to the compressor unit 5 by the rotation of the shaft 3, and is used as lubricating oil for reducing the friction acting between mechanical elements constituting the compressor unit 5. When the compressor unit 5 compresses the low-pressure refrigerant gas to generate the high-pressure refrigerant gas, the freezer oil is mixed with the high-pressure refrigerant gas and supplied to the under-motor space 19. Further, the freezer oil is further discharged to the under-motor space 19 by the rotation of the shaft 3, and is mixed with the high-pressure refrigerant gas. A part of the freezer oil supplied to the under-motor space 19 is supplied to the above-motor space 20 by passing through the plurality of rotor gas holes 47-1 to 47-6 together with the high-pressure refrigerant gas. The freezer oil supplied to the above-motor space 20 is discharged to the device at the subsequent stage of the freezing cycle device through the discharge pipe 12, together with the high-pressure refrigerant gas.

When the freezer oil passes through the rotor gas hole 47-1 together with the high-pressure refrigerant gas, the freezer oil collides with the first protrusion 63-1 or the second protrusion 64-1 and is separated from the refrigerant in the rotor gas hole 47-1. That is, the first protrusion 63-1 or the second protrusion 64-1 serves as an oil separation mechanism for separating the freezer oil from the refrigerant. The freezer oil separated from the refrigerant in the rotor gas hole 47-1 moves to the outer diameter side of the rotor gas hole 47-1 by a centrifugal force caused by the rotation of the rotor 21, and is collected at the outer diameter side of the rotor gas hole 47-1. A part of the freezer oil collected at the outer diameter side of the rotor gas hole 47-1 is supplied to the under-motor space 19 because the entire lower end of the rotor gas hole 47-1 is open. The first protrusion 63-1 and the second protrusion 64-1 covers a part of the outer diameter side of the upper end of the rotor gas hole 47-1, thereby suppressing the freezer oil collected at the outer diameter side of the rotor gas hole 47-1 from being supplied to the above-motor space 20.

The high-pressure refrigerant gas passing through the stator gas passage is supplied to the above-motor space 20, in a state where the freezer oil is not separated. Since the cross-sectional area of the stator gas passage is 6.0 times or less the cross-sectional area of the rotor gas passage, the compressor 1 can decrease the amount of freezer oil supplied to the above-motor space 20 through the stator gas passage. Since the cross-sectional area of the stator outer circumferential gas passage is 1.6 times or less the cross-sectional area of the rotor gas passage, the compressor 1 can further decrease the amount of freezer oil supplied to the above-motor space 20 through the plurality of outer circumferential notch gaps 37-1 to 37-9. As the amount of freezer oil supplied to the above-motor space 20 decreases, the compressor 1 can decrease the amount of freezer oil discharged to the device at the subsequent stage through the discharge pipe 12 together with the refrigerant. The compressor 1 can prevent the amount of freezer oil stored in the container 2 from being decreased by decreasing the amount of freezer oil discharged to the device at the subsequent stage. The compressor 1 can appropriately supply lubricating oil to the compressor unit 5 by preventing the amount of freezer oil stored in the container 2 from being decreased, thereby making it possible to appropriately lubricate the compressor unit 5. Further, the compressor 1 can improve heat exchange efficiency of a heat exchanger of the freezing cycle device by decreasing the amount of discharged oil.

Since the cross-sectional area of the stator gas passage is 5.6 times or more the cross-sectional area of the rotor gas passage, the compressor 1 can reduce the flow path resistance in a plurality of stator gas passages, and thus can reduce the pressure loss when the high-pressure refrigerant gas passes through the plurality of stator gas passages. Since the cross-sectional area of the stator outer circumferential gas passage is 1.2 times or more the cross-sectional area of the rotor gas passage, the compressor 1 can further reduce the pressure loss when the high-pressure refrigerant gas passes through the plurality of outer circumferential notch gaps 37-1 to 37-9. The compressor 1 can suppress a decrease in the pressure of the refrigerant discharged to the device at the subsequent stage by reducing the pressure loss when the high-pressure refrigerant gas passes through the flow path to compress the refrigerant with high efficiency.

Figure 9:
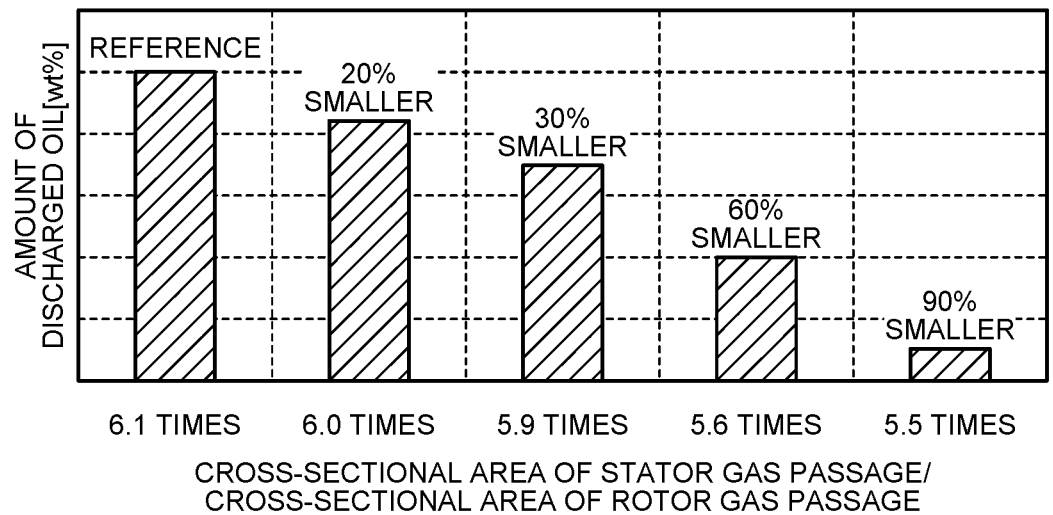
FIG. 9 is a graph illustrating a relationship between a ratio of the cross-sectional area of a stator gas passage to the cross-sectional area of a rotor gas passage and the amount of discharged oil.

FIG. 9 is a graph illustrating a relationship between a ratio of the cross-sectional area of the stator gas passage to the cross-sectional area of the rotor gas passage and the amount of discharged oil in the compressor 1 of the first embodiment. The ratio of the cross-sectional area of the stator gas passage to the cross-sectional area of the rotor gas passage indicates a value obtained by dividing the cross-sectional area of the stator gas passage by the cross-sectional area of the rotor gas passage. The amount of discharged oil indicates the concentration of the freezer oil contained in the refrigerant discharged by the compressor 1.

The graph of FIG. 9 shows that the amount of discharged oil of a compressor in which the ratio is equivalent to 6.0 times is smaller than a reference amount of discharged oil of the compressor 1 in which the ratio is equivalent to 6.1 times, and is 20% smaller than the reference amount of discharged oil. The graph of FIG. 9 also shows that the amount of discharged oil of the compressor in which the ratio is equivalent to 5.9 times is smaller than the reference amount of discharged oil, and is 30% smaller than the reference amount of discharged oil. The graph of FIG. 9 also shows that the amount of discharged oil of the compressor in which the ratio is equivalent to 5.6 times is smaller than the reference amount of discharged oil, and is 60 smaller than the reference amount of discharged oil. The graph of FIG. 9 also shows that the amount of discharged oil of the compressor in which the ratio is equivalent to 5.5 times is smaller than the reference amount of discharged oil, and is 90% smaller than the reference amount of discharged oil. That is, the graph of FIG. 9 shows that the amount of discharged oil decreases as the ratio decreases. Further, the graph of FIG. 9 shows that the amount of freezer oil discharged from the compressor 1 together with the refrigerant is smaller than the reference amount of discharged oil when the cross-sectional area of the stator gas passage is 6.0 times or less the cross-sectional area of the rotor gas passage.

Figure 10:
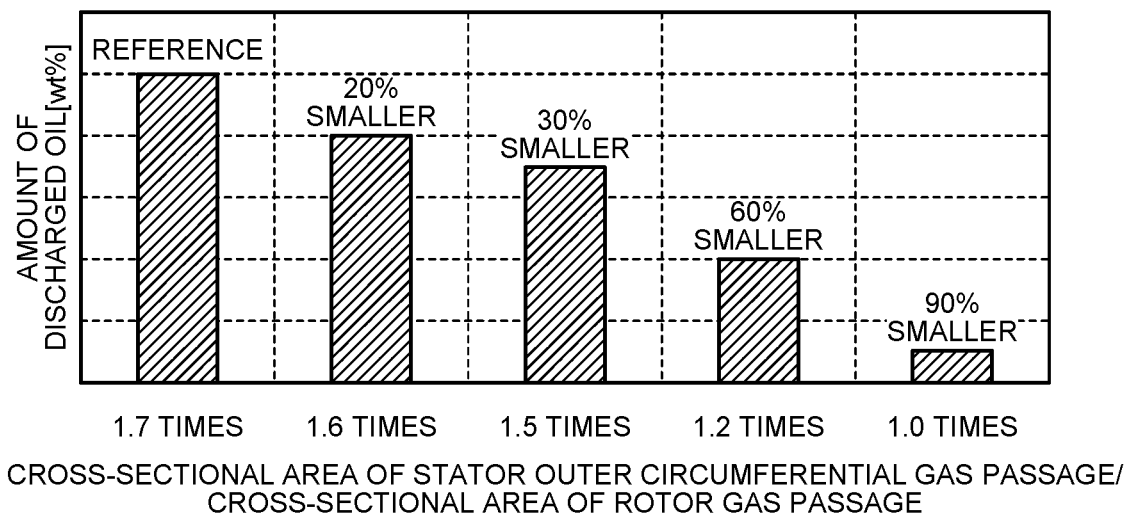
FIG. 10 is a graph illustrating a relationship between a ratio of the cross-sectional area of a stator outer circumferential gas passage to the cross-sectional area of the rotor gas passage and the amount of discharged oil.

FIG. 10 is a graph illustrating a relationship between a ratio of the cross-sectional area of the stator outer circumferential gas passage to the cross-sectional area of the rotor gas passage and the amount of discharged oil in the compressor 1 of the first embodiment. The ratio of the cross-sectional area of the stator outer circumferential gas passage to the cross-sectional area of the rotor gas passage indicates a value obtained by dividing the cross-sectional area of the stator outer circumferential gas passage by the cross-sectional area of the rotor gas passage. The graph of FIG. 10 shows that the amount of discharged oil of the compressor 1 in which the ratio is equivalent to 1.6 times is smaller than a reference amount of discharged oil of the compressor 1 in which the ratio is equivalent to 1.7 times, and is 20% smaller than the reference amount of discharged oil. The graph of FIG. 10 shows that the amount of discharged oil of the compressor 1 in which the ratio is equivalent to 1.5 times is smaller than a reference amount of discharged oil of the compressor 1 in which the ratio is equivalent to 1.7 times, and is 30% smaller than the reference amount of discharged oil. The graph of FIG. 10 shows that the amount of discharged oil of the compressor in which the ratio is equivalent to 1.2 times is smaller than the reference amount of discharged oil, and is 60% smaller than the reference amount of discharged oil. The graph of FIG. 10 shows that the amount of discharged oil of the compressor in which the ratio is equivalent to 1.0 times is smaller than the reference amount of discharged oil, and is 90% smaller than the reference amount of discharged oil. That is, the graph of FIG. 10 shows that the amount of discharged oil decreases as the ratio decreases. Further, the graph of FIG. 10 shows that the amount of freezer oil discharged from the compressor 1 together with the refrigerant is smaller than the reference amount of discharged oil when the cross-sectional area of the stator outer circumferential gas passage is 1.6 times or less the cross-sectional area of the rotor gas passage.

Figure 11:
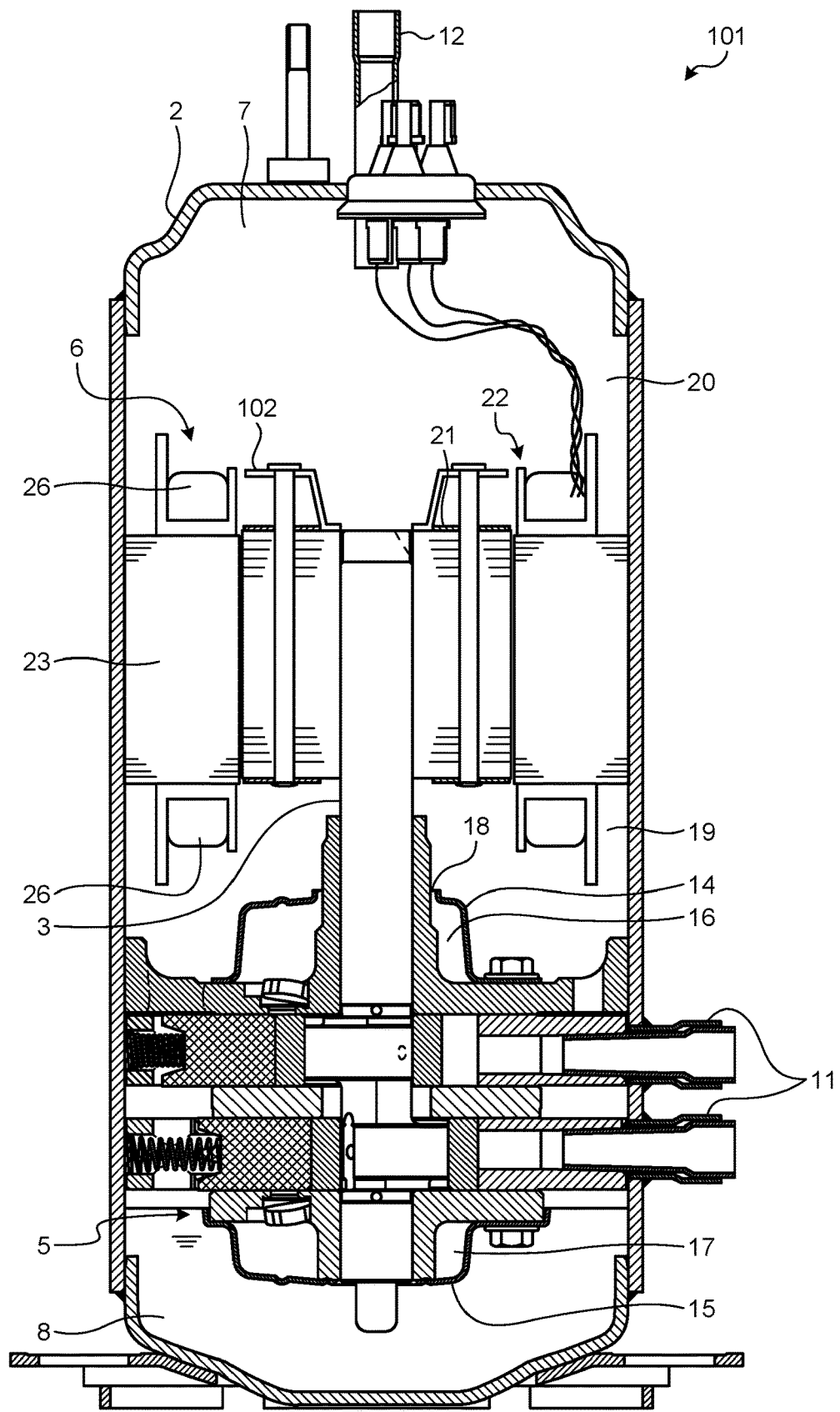
FIG. 11 is a vertical cross-sectional view illustrating a compressor of a comparative example.

FIG. 11 is a vertical cross-sectional view illustrating a compressor 101 of a comparative example. As illustrated in FIG. 11, in the compressor 101 of the comparative example, an oil separation plate 102 is added as an oil separation mechanism for separating the freezer oil from the refrigerant. In the compressor 101, the plurality of first protrusions 63-1 to 63-6 and the plurality of second protrusions 64-1 to 64-6 of the upper rotor end plate 43 are also omitted, that is, all of the upper ends of the plurality of rotor gas holes 47-1 to 47-6 are exposed to the above-motor space 20.

When the shaft 3 rotates, the oil separation plate 102 centrifuges the freezer oil from the refrigerant supplied to the above-motor space 20 through the plurality of rotor gas holes 47-1 to 47-6, and supplies the centrifuged freezer oil to the plurality of stator gas passages. The plurality of stator gas holes supply the refrigerant compressed by the compressor unit 5 from the under-motor space 19 to the above-motor space 20, and supply the centrifuged freezer oil to the under-motor space 19. Here, in the plurality of stator gas holes, as the amount of freezer oil supplied from the above-motor space 20 to the under-motor space 19 increases, the amount of refrigerant supplied from the under-motor space 19 to the above-motor space 20 decreases.

Figure 12:
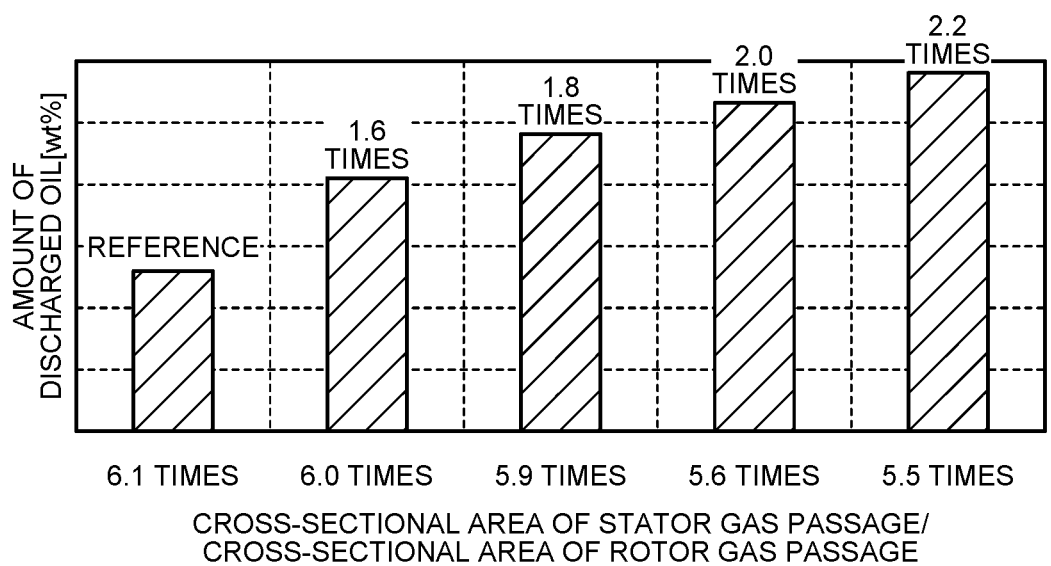
FIG. 12 is a graph illustrating a relationship between a ratio of the cross-sectional area of a stator gas passage to the cross-sectional area of a rotor gas passage and the amount of discharged oil in the compressor of the comparative example.

FIG. 12 is a graph illustrating a relationship between a ratio of the cross-sectional area of the stator outer circumferential gas passage to the cross-sectional area of the rotor gas passage and the amount of discharged oil in the compressor 101 of the comparative example. The graph of FIG. 12 shows that the amount of discharged oil of the compressor 101 in which the ratio is equivalent to 6.0 times is larger than a reference amount of discharged oil of the compressor 101 in which the ratio is equivalent to 6.1 times, and is 1.6 times the reference amount of discharged oil. The graph of FIG. 12 shows that the amount of discharged oil of the compressor 101 in which the ratio is equivalent to 5.9 times is larger than the reference amount of discharged oil, and is 1.8 times the reference amount of discharged oil. The graph of FIG. 12 shows that the amount of discharged oil of the compressor 101 in which the ratio is equivalent to 5.6 times is larger than the reference amount of discharged oil, and is 2.0 times the reference amount of discharged oil. The graph of FIG. 12 shows that the amount of discharged oil of the compressor 101 in which the ratio is equivalent to 5.5 times is larger than the reference amount of discharged oil, and is 2.2 times the reference amount of discharged oil. That is, the graph of FIG. 12 shows that the amount of discharged oil increases as the ratio decreases. Further, the graph of FIG. 12 shows that, when the ratio is small, it becomes difficult for the freezer oil separated by the oil separation plate 102 to return to the under-motor space 19 through the stator gas passage (the amount of returned freezer oil decreases), and thus the amount of discharged oil of the compressor 101 of the comparative example increases.

Since the compressor 1 of the first embodiment does not include the oil separation plate 102, the amount of freezer oil returned to the under-motor space 19 through the stator gas passage is smaller than that of the compressor 101 of the comparative example. Therefore, the compressor 1 of the first embodiment can decrease the amount of discharged oil even when the ratio is small.

[Effect of Compressor 1 of First Embodiment]

The compressor 1 of the first embodiment includes the motor unit 6 that includes the rotor 21 and the stator 22 surrounding the rotor 21, the compressor unit 5 that compresses the refrigerant by the rotation of the rotor 21, and the container 2 forming the internal space 7 in which the motor unit 6 and the compressor unit 5 are housed. In the rotor 21, the plurality of rotor gas holes 47-1 to 47-6, through which the refrigerant flows from the under-motor space 19 formed on the side of the internal space 7 that is closer to the compressor unit 5 than motor unit 6 to the above-motor space 20 formed on the side of the internal space 7 that is more distant from the compressor unit 5 than from the motor unit 6, are formed. In the stator 22, the stator gas passage including the plurality of outer circumferential notch gaps 37-1 to 37-9, the plurality of slot gaps 38-1 to 38-9, and the air gap 39 is formed. The refrigerant flows from the under-motor space 19 to the above-motor space 20 through the stator gas passage. At this time, the cross-sectional area of the stator gas passage is 6.0 times or less the cross-sectional area of the rotor gas passage formed by the plurality of rotor gas holes 47-1 to 47-6. Such a compressor 1 can decrease the amount of freezer oil discharged together with the refrigerant when the plurality of rotor gas holes 47-1 to 47-6 decrease the amount of freezer oil supplied to the above-motor space 20. In addition, the compressor 1 of the first embodiment can adjust the cross-sectional area of the stator gas passage, such that the amount of discharged oil does not excessively decrease (an excessive amount of freezer oil is not collected in the compressor). Therefore, for example, in a case where the compressor is filled with the freezer oil under the assumption that the freezer oil is discharged to some extent, the cross-sectional area of the stator gas passage is set to 6.0 times or less and 5.6 times or more the cross-sectional area of the rotor gas passage, such that it is possible to prevent the motor unit from being immersed in the freezer oil due to an excessive amount of freezer oil collected in the compressor 1.

Further, the stator gas passage of the compressor 1 of the first embodiment includes the plurality of outer circumferential notch gaps 37-1 to 37-9 formed between the stator 22 and the container 2. It is also possible to decrease the amount of freezer oil discharged together with the refrigerant by setting the cross-sectional area of the stator outer circumferential gas passage to 1.6 times or less the cross-sectional area of the rotor gas passage. In addition, it is possible to increase the amount of discharged oil by setting the cross-sectional area of the stator outer circumferential gas passage to be larger than the cross-sectional area of the rotor gas passage. Therefore, for example, by setting the cross-sectional area of the stator outer circumferential gas passage to 1.2 times or more the cross-sectional area of the rotor gas passage, the amount of discharged oil can become 60l smaller than the reference amount of discharged oil, thereby making it possible to prevent an excessive amount of freezer oil from being collected in the compressor 1. In a case where the amount of discharged oil can be adjusted by the outer circumference of the stator in this way, it is not necessary to consider the amount of winding and the like, and thus the amount of discharged oil can be easily adjusted.

Further, the rotor 21 of the compressor 1 of the first embodiment includes the rotor core 41 in which the plurality of rotor gas holes 47-1 to 47-6 are formed, and the upper rotor end plate 43 that covers the upper rotor end surface 46 of the rotor core 41, the upper rotor end surface 46 being on a side distant from the compressor unit 5. The upper ends of the plurality of rotor gas holes 47-1 to 47-6 are formed in the upper rotor end surface 46, the upper ends being on the side distance from the compressor unit 5. In the upper rotor end plate 43, an upper opening 62, a plurality of first protrusions 63-1 to 63-6, and a plurality of second protrusions 64-1 to 64-6 are formed. The upper opening 62 allows the plurality of rotor gas holes 47-1 to 47-6 to communicate with the above-motor space 20. The plurality of first protrusions 63-1 to 63-6 and the plurality of second protrusions 64-1 to 64-6 cover regions of the upper ends of the plurality rotor gas holes 47-1 to 47-6, the regions being on a side distance from the rotation axis around which the rotor 21 rotates. Such an upper rotor end plate 43 can decrease the amount of freezer oil supplied to the above-motor space 20 together with the refrigerant through the plurality of rotor gas holes 47-1 to 47-6.

Further, the upper opening 62 of the compressor 1 of the first embodiment exposes a predetermined region of the upper rotor end surface 46 to the above-motor space 20. The predetermined region is adjacent to the upper ends of the plurality of rotor gas holes 47-1 to 47-6, and is arranged closer to the rotation axis than the upper ends of the plurality of rotor gas holes 47-1 to 47-6. Such a compressor can reduce the flow path resistance of the refrigerant flowing from the under-motor space 19 to the above-motor space 20 through the plurality of rotor gas holes 47-1 to 47-6.

Further, the upper opening 62 of the compressor 1 of the first embodiment is a hole that allows all of the plurality of rotor gas holes 47-1 to 47-6 to communicate with the above-motor space 20. Such a lower rotor end plate 42 can be easily manufactured, and thus the compressor 1 can be easily manufactured.

Further, the exterior inner wall surface 51 that is formed on a side distant from the rotation axis among the inner wall surfaces of the plurality of rotor gas holes 47-1 to 47-6 of the compressor 1 of the first embodiment includes the first exterior inner wall surface portion 53, the second exterior inner wall surface portion 54, and the middle exterior inner wall surface portion 55. The middle exterior inner wall surface portion 55 is formed between the first exterior inner wall surface portion 53 and the second exterior inner wall surface portion 54, and is formed closer to the rotation axis than the first exterior inner wall surface portion 53 and the second exterior inner wall surface portion 54. The plurality of first protrusions 63-1 to 63-6 cover regions adjacent to the first exterior inner wall surface portions 53 of the upper ends of the plurality of rotor gas holes 47-1 to 47-6. The plurality of second protrusions 64-1 to 64-6 cover regions adjacent to the second exterior inner wall surface portions 54 of the upper ends of the plurality of rotor gas holes 47-1 to 47-6. Such a compressor 1 can cool the plurality of permanent magnets 44-1 to 44-6 by using the refrigerant passing through the plurality of rotor gas holes 47-1 to 47-6 due to a short distance between the plurality of rotor gas holes 47-1 to 47-6 and the plurality of permanent magnets 44-1 to 44-6.

Second Embodiment

Figure 13:
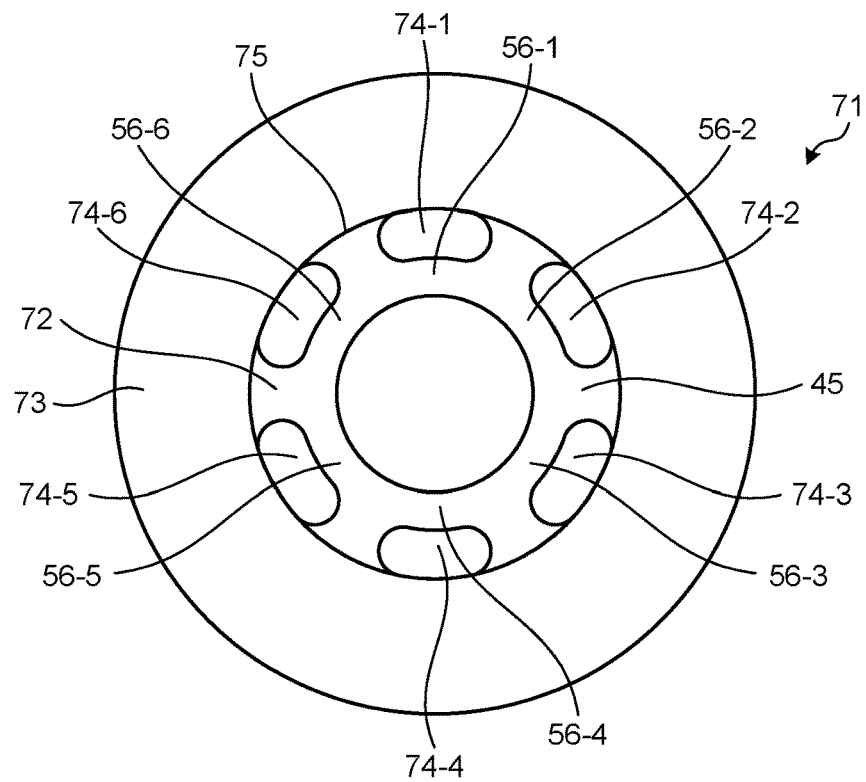
FIG. 13 is a bottom view illustrating a rotor of a compressor of a second embodiment.

Although the plurality of rotor gas holes 47-1 to 47-6 of the compressor 1 of the first embodiment described above are formed in a V shape, the plurality of rotor gas holes 47-1 to 47-6 may also be formed in a shape different from the V shape. In a compressor of a second embodiment, the rotor 21 of the compressor 1 of the first embodiment described above is replaced with another rotor 71 as illustrated in FIG. 13. FIG. 13 is a bottom view illustrating the rotor 71 of the compressor of the second embodiment. The rotor 71 includes a rotor core 72 and a lower rotor end plate 73, similarly to the rotor 21 described above. In the rotor core 72, a lower rotor end surface 45 is formed, similarly to the rotor core 41. In the rotor core 72, a plurality of rotor gas holes 74-1 to 74-6 are formed. Each of the plurality of rotor gas holes 74-1 to 74-6 is formed so that a cross-sectional surface where a plane perpendicular to a rotation axis of a shaft 3 intersects the plurality of rotor gas holes 74-1 to 74-6 has a substantially elliptical shape. The lower rotor end surface 45 includes a plurality of lower inner diameter side adjacent regions 56-1 to 56-6. A plurality of lower inner diameter side adjacent regions 56-1 to 56-6 is arranged to be more adjacent to an inner diameter side than lower ends of the plurality of rotor gas holes 74-1 to 74-6 are, respectively, and are adjacent to the lower ends of the plurality of rotor gas holes 74-1 to 74-6, respectively.

The lower rotor end plate 73 is formed in a substantially disk shape similarly to the lower rotor end plate 42, is in close contact with the lower rotor end surface 45 so as to cover the lower rotor end surface 45 of the rotor core 72, and is fixed to the rotor core 72. In the lower rotor end plate 73, a lower opening 75 is formed. The lower opening 75 is formed at the center of the lower rotor end plate 73. The lower opening 75 allows each of the lower ends of the plurality of rotor gas holes 74-1 to 74-6 to be open to an under-motor space 19, thereby allowing each of the plurality of rotor gas holes 74-1 to 74-6 to communicate with the under-motor space 19. The lower opening 75 also exposes each of the plurality of lower inner diameter side adjacent regions 56-1 to 56-6 to the under-motor space 19.

Figure 14:
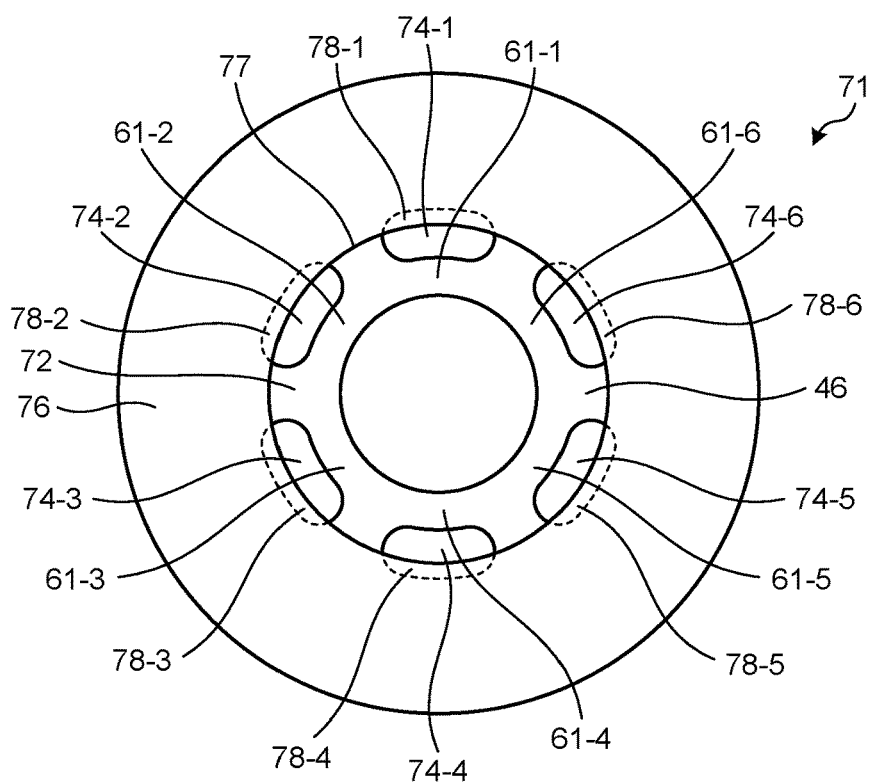
FIG. 14 is a top view illustrating the rotor of the compressor of the second embodiment.

FIG. 14 is a top view illustrating the rotor 71 of the compressor of the second embodiment. As illustrated in FIG. 14, an upper rotor end surface 46 is formed in the rotor core 72, similarly to the rotor core 41, and the upper rotor end surface 46 includes a plurality of upper inner diameter side adjacent regions 61-1 to 61-6. The plurality of upper inner diameter side adjacent regions 61-1 to 61-6 are arranged to be more adjacent to the inner diameter side that is close to the rotation axis of the shaft 3 than upper ends of the plurality of rotor gas holes 74-1 to 74-6 are, respectively, and are adjacent to the upper ends of the plurality of rotor gas holes 74-1 to 74-6, respectively.

The rotor 71 further includes an upper rotor end plate 76. The upper rotor end plate 76 is formed in a substantially disk shape similarly to the upper rotor end plate 43, is in close contact with the upper rotor end surface 46 so as to cover the upper rotor end surface 46 of the rotor core 72, and is fixed to the rotor core 72. In the upper rotor end plate 76, an upper opening 77 and a plurality of protrusions 78-1 to 78-6 are formed. The upper opening 77 is formed at the center of the upper rotor end plate 76. The upper opening 77 exposes an upper end of the shaft 3 to an above-motor space 20. The upper opening 77 also allows a part of the upper end of each of the plurality of rotor gas holes 74-1 to 74-6 that is adjacent to the inner diameter side to be open to the above-motor space 20, and allows each of the plurality of rotor gas holes 74-1 to 74-6 to communicate with the above-motor space 20. The upper opening 77 also exposes each of the plurality of upper inner diameter side adjacent regions 61-1 to 61-6 to the above-motor space 20. Therefore, the compressor of the second embodiment can reduce the flow path resistance when the refrigerant flows through the plurality of rotor gas holes 74-1 to 74-6, similarly to the compressor 1 of the first embodiment described above.

Each of the plurality of protrusions 78-1 to 78-6 is formed at the edge of the upper opening 77. The plurality of protrusions 78-1 to 78-6 cover outer diameter side regions of the upper ends of the plurality of rotor gas holes 74-1 to 74-6, respectively. Therefore, similarly to the compressor 1 of the first embodiment described above, the compressor of the second embodiment can suppress the freezer oil collected in outer diameter sides of the plurality of rotor gas holes 74-1 to 74-6 from being supplied to the above-motor space 20.

The compressor of the second embodiment is also formed so that the cross-sectional area of a stator gas passage is 5.6 times or more the cross-sectional area of a rotor gas passage and the cross-sectional area of the stator gas passage is 6.0 times or less the cross-sectional area of the rotor gas passage. The compressor of the second embodiment is also formed so that the cross-sectional area of a plurality of outer circumferential notch gaps 37-1 to 37-9 is 1.2 times or more the cross-sectional area of the rotor gas passage and the cross-sectional area of the plurality of outer circumferential notch gaps 37-1 to 37-9 is 1.6 times or less the cross-sectional area of the rotor gas passage. Therefore, the compressor of the second embodiment can compress the refrigerant with high efficiency and decrease the amount of freezer oil discharged together with the refrigerant, similarly to the compressor of the first embodiment described above.

Third Embodiment

Although the number of lower openings 75 formed in the lower rotor end plate 73 of the compressor of the second embodiment described above is one here, a plurality of lower openings may be formed. In addition, although the number of upper openings 77 formed in the upper rotor end plate 76 of the compressor of the second embodiment described above is one here, a plurality of upper openings may be formed.

Figure 15:
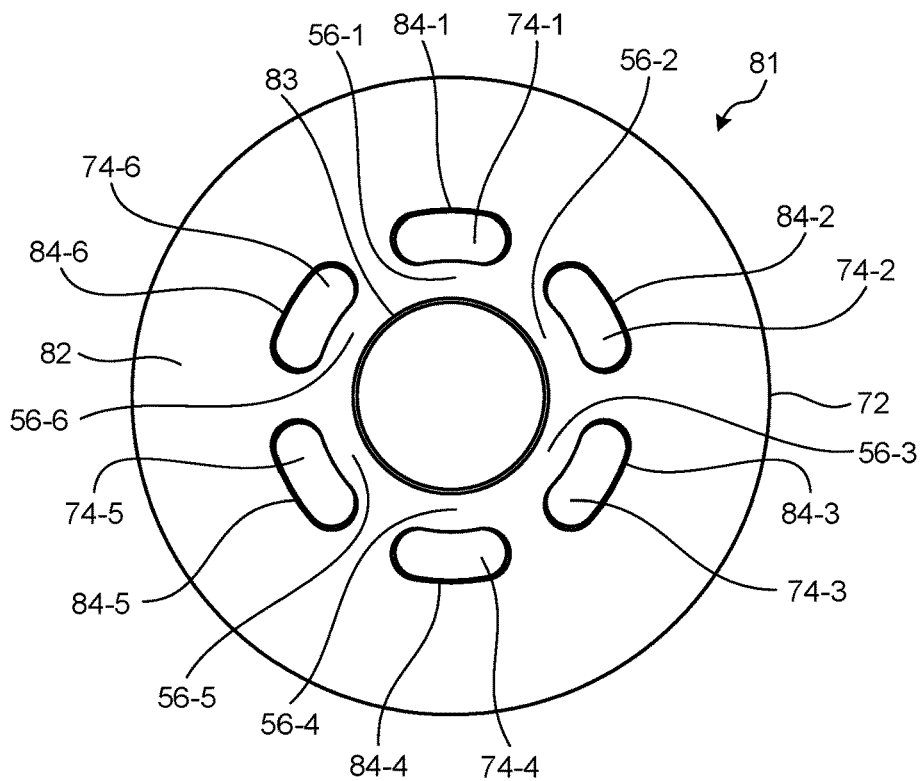
FIG. 15 is a bottom view illustrating a rotor of a compressor of a third embodiment.

In a rotor 81 of a compressor of a third embodiment, the lower rotor end plate 73 of the rotor 71 of the compressor of the second embodiment described above is replaced with another lower rotor end plate 82 as illustrated in FIG. 15. FIG. 15 is a bottom view illustrating the rotor 81 of the compressor of the third embodiment. In the lower rotor end plate 82, a lower central hole 83 and a plurality of lower openings 84-1 to 84-6 are formed. The lower central hole 83 is formed at the center of the lower rotor end plate 82. The lower central hole 83 is penetrated by a shaft 3 when the rotor 81 is fixed to the shaft 3. The plurality of lower openings 84-1 to 84-6 are formed around the lower central hole 83. The plurality of lower openings 84-1 to 84-6 allow each of lower ends of a plurality of rotor gas holes 74-1 to 74-6 to be open to an under-motor space 19, thereby allowing each of the plurality of rotor gas holes 74-1 to 74-6 to communicate with the under-motor space 19. The lower rotor end plate 82 also covers a plurality of lower inner diameter side adjacent regions 56-1 to 56-6 and covers all regions of the lower rotor end surface 45 that are adjacent to the plurality of rotor gas holes 74-1 to 74-6.

Figure 16:
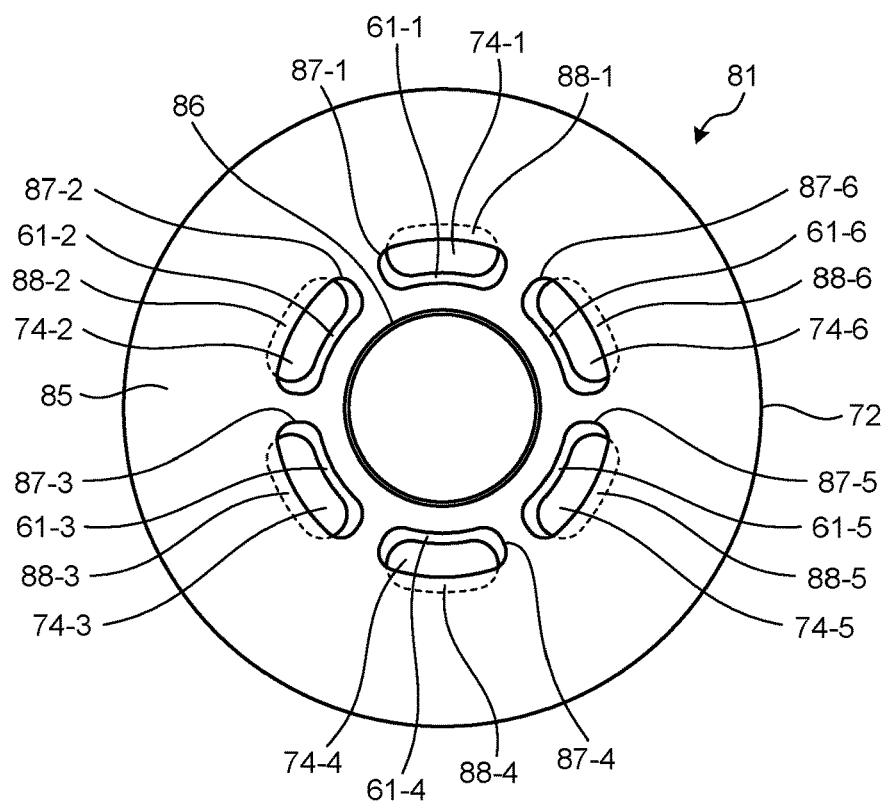
FIG. 16 is a top view illustrating the rotor of the compressor of the third embodiment.

FIG. 16 is a top view illustrating the rotor 81 of the compressor of the third embodiment. In the rotor 81, the upper rotor end plate 76 of the rotor 71 of the compressor of the second embodiment described above is replaced with an upper rotor end plate 85 as illustrated in FIG. 16. In the upper rotor end plate 85, an upper central hole 86, a plurality of upper openings 87-1 to 87-6, and a plurality of protrusions 88-1 to 88-6 are formed. The upper central hole 86 is formed at the center of the upper rotor end plate 85. The upper central hole 86 exposes an upper end of the shaft 3 to an above-motor space 20 when the rotor 81 is fixed to the shaft 3.

The plurality of upper openings 87-1 to 87-6 are formed around the upper central hole 86. The plurality of upper openings 87-1 to 87-6 allow a part of an upper end of each of the plurality of rotor gas holes 74-1 to 74-6 that is adjacent to an inner diameter side to be open to an internal space 7, and allows each of the plurality of rotor gas holes 74-1 to 74-6 to communicate with the above-motor space 20. The plurality of upper openings 87-1 to 87-6 also expose each of a plurality of upper inner diameter side adjacent regions 61-1 to 61-6 to the above-motor space 20. The plurality of protrusions 88-1 to 88-6 are formed on outer diameter sides of the plurality of upper openings 87-1 to 87-6 that are distant from a rotation axis of the shaft 3, respectively. The plurality of protrusions 88-1 to 88-6 partially cover outer diameter sides of the upper ends of the plurality of rotor gas holes 74-1 to 74-6, respectively. Therefore, similarly to the compressor 1 of the first embodiment described above, the compressor of the third embodiment can suppress the freezer oil collected in outer diameter sides of the plurality of rotor gas holes 74-1 to 74-6 from being supplied to the above-motor space 20.

The compressor of the third embodiment is also formed so that a ratio of the cross-sectional area of a stator gas passage to the cross-sectional area of a rotor gas passage and a ratio of the cross-sectional area of a stator outer circumferential gas passage to the cross-sectional area of the rotor gas passage are included in a predetermined range. Therefore, the compressor of the third embodiment can compress the refrigerant with high efficiency and decrease the amount of freezer oil discharged together with the refrigerant, similarly to the compressor 1 of the first embodiment described above.

Although the lower rotor end plate 82 of the compressor of the third embodiment covers the plurality of lower inner diameter side adjacent regions 56-1 to 56-6 here, the plurality of lower inner diameter side adjacent regions 56-1 to 56-6 may be exposed to the under-motor space 19. At this time, the compressor can further reduce the flow path resistance when the refrigerant flows through the plurality of rotor gas holes 74-1 to 74-6 as compared with the compressor of the third embodiment described above, and can compress the refrigerant with higher efficiency.

Fourth Embodiment

Figure 17:
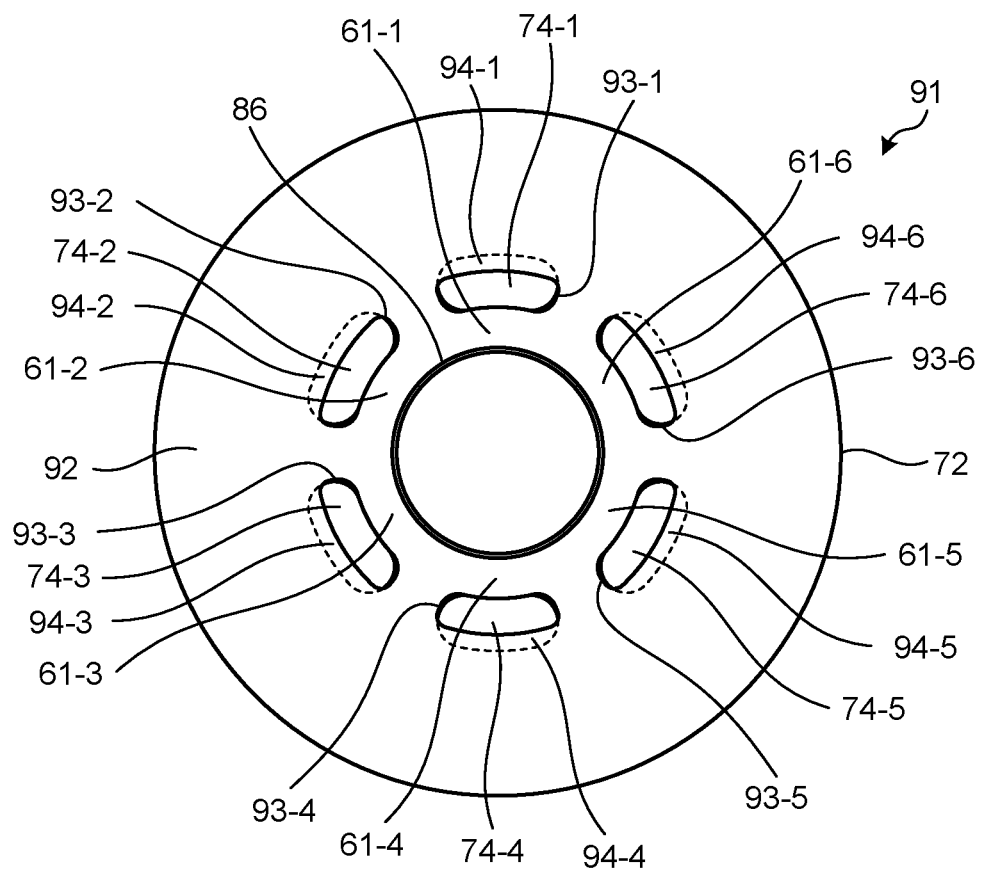
FIG. 17 is a top view illustrating a rotor of a compressor of a fourth embodiment.

Although the upper rotor end plate 85 of the compressor of the third embodiment exposes each of the plurality of upper inner diameter side adjacent regions 61-1 to 61-6 to the above-motor space 20 here, the upper rotor end plate 85 may cover the plurality of upper inner diameter side adjacent regions 61-1 to 61-6. In a rotor 91 of a compressor of a fourth embodiment, the upper rotor end plate 85 of the compressor of the third embodiment described above is replaced with another upper rotor end plate 92 as illustrated in FIG. 17. FIG. 17 is a top view illustrating the rotor 91 of the compressor of the fourth embodiment. In the upper rotor end plate 92, an upper central hole 86 is formed, similarly to the upper rotor end plate 85. In the upper rotor end plate 92, a plurality of upper openings 93-1 to 93-6, and a plurality of protrusions 94-1 to 94-6 are formed. The plurality of upper openings 93-1 to 93-6 are formed around the upper central hole 86. The plurality of upper openings 93-1 to 93-6 allow a part of an upper end of each of a plurality of rotor gas holes 74-1 to 74-6 that is adjacent to an inner diameter side to be open to an internal space 7, and allows each of the plurality of rotor gas holes 74-1 to 74-6 to communicate with an above-motor space 20. The upper rotor end plate 92 also covers a plurality of upper inner diameter side adjacent regions 61-1 to 61-6 and covers all regions of an upper rotor end surface 46 that are adjacent to the plurality of rotor gas holes 74-1 to 74-6.

The plurality of protrusions 94-1 to 94-6 are formed on outer diameter sides of the plurality of upper openings 93-1 to 93-6 that are distant from a rotation axis of a shaft 3, respectively. The plurality of protrusions 94-1 to 94-6 partially cover outer diameter sides of the upper ends of the plurality of rotor gas holes 74-1 to 74-6, respectively. Therefore, similarly to the compressor 1 of the first embodiment described above, the compressor of the fourth embodiment can suppress the freezer oil collected in outer diameter sides of the plurality of rotor gas holes 74-1 to 74-6 from being supplied to the above-motor space 20.

The compressor of the fourth embodiment is also formed so that a ratio of the cross-sectional area of a stator gas passage to the cross-sectional area of a rotor gas passage and a ratio of the cross-sectional area of a stator outer circumferential gas passage to the cross-sectional area of the rotor gas passage are included in a predetermined range. Therefore, the compressor of the fourth embodiment can compress the refrigerant with high efficiency and decrease the amount of freezer oil discharged together with the refrigerant, similarly to the compressor 1 of the first embodiment described above.

In the compressor of the fourth embodiment, as the upper rotor end plate 92 cover the plurality of upper inner diameter side adjacent regions 61-1 to 61-6, the flow path resistances of the plurality of rotor gas holes 74-1 to 74-6 may increase. That is, since the plurality of upper inner diameter side adjacent regions 61-1 to 61-6 are exposed to the above-motor space 20 in the compressors of the first to third embodiments described above, the compressors of the first to third embodiments described above can further reduce the flow path resistance of the plurality of rotor gas holes 74-1 to 74-6 as compared with the compressor of the fourth embodiment.

In the compressors of the embodiments described above, the freezer oil is separated from the refrigerant flowing through the plurality of rotor gas passages by using the upper rotor end plates 43, 76, 85, and 92, but the refrigerant may be separated by using another member. Examples of another member include a member that is not arranged at an end portion of the rotor gas hole in an axial direction, but is provided on an outer diameter side of an inner portion of the rotor gas hole. Similar to the compressors of the embodiments described above, the compressor in which such a member is provided can separate the freezer oil from the refrigerant flowing through the rotor gas passage, and can decrease the amount of the freezer oil discharged together with the refrigerant.

Although the compressor unit 5 of each of the compressors of the embodiments is a rotary compressor here, the compressor unit 5 may be replaced with another compressor unit that is a mechanism different from the rotary compressor. Examples of the mechanism include a scroll compressor.

Although the embodiments have been described above, the embodiments are not limited by the contents described above. Further, the components described above include those that can be easily assumed by those skilled in the art, those that are substantially the same, and those that are in a so-called equivalent range. Furthermore, the components described above can be combined appropriately. In addition, at least one of various omissions, substitutions or changes of the components can be made without departing from the gist of the embodiments.

REFERENCE SIGNS LIST

1 Compressor
2 Container
5 Compressor unit
6 Motor unit
7 Internal space
19 Under-motor space
20 Above-motor space
21 Rotor
22 Stator
23 Stator core
35 Inner circumferential surface
37-1 to 37-9 A plurality of outer circumferential notch gaps
38-1 to 38-9 A plurality of slot gaps
39 Air gap
41 Rotor core
42 Lower rotor end plate
43 Upper rotor end plate
44-1 to 44-6 A plurality of permanent magnets
45 Lower rotor end surface
46 Upper rotor end surface
47-1 to 47-6 A plurality of rotor gas holes
51 Exterior inner wall surface
53 First exterior inner wall surface portion
54 Second exterior inner wall surface portion
55 Middle exterior inner wall surface portion
56-1 to 56-6 A plurality of lower inner diameter side adjacent regions
57 Lower opening
61-1 to 61-6 A plurality of upper inner diameter side adjacent region
62 Upper opening
63-1 to 63-6 A plurality of first protrusions
64-1 to 64-6 A plurality of second protrusions

The invention claimed is:

1. A compressor comprising:
   a motor unit that includes a rotor and a stator surrounding the rotor;
   a compressor unit that compresses a refrigerant by rotation of the rotor; and
   a container that forms an internal space in which the motor unit and the compressor unit are housed,
   wherein in the rotor, a rotor gas passage through which the refrigerant flows from an under-motor space of the internal space arranged on a side of the motor unit that is close to the compressor unit to an above-motor space of the internal space arranged on a side of the motor unit that is distant from the compressor unit is formed, in the stator, a stator gas passage through which the refrigerant flows from the under-motor space to the above-motor space is formed, and a cross-sectional area of the stator gas passage is 5.6 to 6.0 times a cross-sectional area of the rotor gas passage.

2. The compressor according to claim 1,
wherein the rotor includes an oil separation mechanism.

3. The compressor according to claim 2,
wherein the rotor includes a rotor core in which the rotor gas passage is formed, and an upper end plate that covers an upper end surface of the rotor core, the upper end plate is on a side distant from the compressor unit, an upper end of the rotor gas passage is formed in the upper end surface, and in the upper end plate, an opening that allows the rotor gas passage to communicate with the above-motor space is formed, and a protrusion is formed, by offsetting the opening, such that the protrusion covers the upper end of the rotor gas passage on a side distant from a rotation axis around which the rotor rotates.

4. The compressor according to claim 3,
wherein the opening exposes a region of the upper end surface to the above-motor space, the region of the upper end surface is adjacent to the upper end of the rotor gas passage and arranged closer to the rotation axis than the upper end of the rotor gas passage.

5. The compressor according to claim 4,
wherein the opening is one hole that allows the entire rotor gas passage to communicate with the above-motor space.

6. The compressor according to claim 3,
wherein an exterior inner wall surface of an inner wall surface of the rotor gas passage, the exterior inner wall surface is formed on a side distant from the rotation axis, includes a first exterior inner wall surface portion, a second exterior inner wall surface portion, and a middle exterior inner wall surface portion that is formed between the first exterior inner wall surface portion and the second exterior inner wall surface portion, the middle exterior inner wall surface portion is formed on a side of the first exterior inner wall surface portion and the second exterior inner wall surface portion that is close to the rotation axis, and the protrusion covers a region of the upper end that is adjacent to the first exterior inner wall surface portion and a region of the upper end that is adjacent to the second exterior inner wall surface portion.

7. A compressor comprising:

a motor unit that includes a rotor and a stator surrounding the rotor;

a compressor unit that compresses a refrigerant by rotation of the rotor; and a container that forms an internal space in which the motor unit and the compressor unit are housed, wherein in the rotor, a rotor gas passage through which the refrigerant flows from an under-motor space of the internal space that is arranged on a side of the motor unit that is close to the compressor unit to an above-motor space of the internal space arranged on a side of the motor unit that is distant from the compressor unit is formed, in the stator, a stator gas passage through which the refrigerant flows from the under-motor space to the above-motor space is formed, the stator gas passage includes a stator outer circumferential gas passage formed between the stator and the container, and a cross-sectional area of the stator outer circumferential gas passage is 1.2 to 1.6 times a cross-sectional area of the rotor gas passage.

8. The compressor according to claim 7,
wherein the rotor includes an oil separation mechanism.

9. The compressor according to claim 8,
wherein the rotor includes a rotor core in which the rotor gas passage is formed, and an upper end plate that covers an upper end surface of the rotor core, the upper end plate is on a side distant from the compressor unit, an upper end of the rotor gas passage is formed in the upper end surface, and in the upper end plate, an opening that allows the rotor gas passage to communicate with the above-motor space is formed, and a protrusion is formed, by offsetting the opening, such that the protrusion covers the upper end of the rotor gas passage on a side distant from a rotation axis around which the rotor rotates.

10. The compressor according to claim 9,
wherein the opening exposes a region of the upper end surface to the above-motor space, the region of the upper end surface is adjacent to the upper end of the rotor gas passage and arranged closer to the rotation axis than the upper end of the rotor gas passage.

11. The compressor according to claim 10,
wherein the opening is one hole that allows the entire rotor gas passage to communicate with the above-motor space.

12. The compressor according to claim 9,
wherein an exterior inner wall surface of an inner wall surface of the rotor gas passage, the exterior inner wall surface is formed on a side distant from the rotation axis, includes a first exterior inner wall surface portion, a second exterior inner wall surface portion, and a middle exterior inner wall surface portion that is formed between the first exterior inner wall surface portion and the second exterior inner wall surface portion, the middle exterior inner wall surface portion is formed on a side of the first exterior inner wall surface portion and the second exterior inner wall surface portion that is close to the rotation axis, and the protrusion covers a region of the upper end that is adjacent to the first exterior inner wall surface portion and a region of the upper end that is adjacent to the second exterior inner wall surface portion.

\* \* \* \* \*